United States Patent [19]
Takada

[11] Patent Number: 5,870,231
[45] Date of Patent: Feb. 9, 1999

[54] ZOOM LENS SYSTEM

[75] Inventor: Katsuhiro Takada, Hachioji, Japan

[73] Assignee: Olympus Optical Co., Ltd., Tokyo, Japan

[21] Appl. No.: 672,543

[22] Filed: Jun. 28, 1996

[30] Foreign Application Priority Data

| Jun. 30, 1995 | [JP] | Japan | 7-186553 |
| Jun. 30, 1995 | [JP] | Japan | 7-186585 |
| Jul. 5, 1995 | [JP] | Japan | 7-169513 |
| Jul. 14, 1995 | [JP] | Japan | 7-200283 |
| Jul. 14, 1995 | [JP] | Japan | 7-200285 |

[51] Int. Cl.$^6$ .................................................. G02B 15/14
[52] U.S. Cl. ........................... 359/687; 359/683; 359/684
[58] Field of Search ................................... 359/687, 684, 359/683

[56] References Cited

U.S. PATENT DOCUMENTS 5,359,457 10/1994 Saka et al. .............................. 359/684

FOREIGN PATENT DOCUMENTS

| 62-153913 | 7/1987 | Japan . |
| 62-178917 | 8/1987 | Japan . |
| 62-215225 | 9/1987 | Japan . |
| 63-123009 | 5/1988 | Japan . |
| 1-126614 | 5/1989 | Japan . |
| 6-056453 | 3/1994 | Japan . |

Primary Examiner—Georgia Epps
Assistant Examiner—Jordan M. Schwartz
Attorney, Agent, or Firm—Pillsbury Madison & Sutro LLP

[57] ABSTRACT

A zoom lens system comprising, in order from the object side, a first positive lens unit, a second lens unit which is moved monotonously during zooming mainly for sharing a vari-focal function and has a positive power, a third positive lens unit, and a fourth lens unit which is moved during zooming forward and backward mainly for correcting a location of an image surface and has a positive power; the third lens unit consisting of a first lens component which comprises at least one positive lens element and a second lens component which comprises at least one negative lens element, whereas the fourth lens unit consisting of a first lens component which comprises at least one negative lens element and a second lens component which comprises at least one positive lens element.

44 Claims, 8 Drawing Sheets

ZOOM LENS SYSTEM

BACKGROUND OF THE INVENTION a) Field of the Invention:

The present invention relates to a zoom lens system which has high optical performance and is suited for use in video cameras, still video cameras and other optical appliances recently developed for picking up highly precise and minute images.

b) Description of the Prior Art:

Cameras which use solid-state image pickup devices generally adopt, as photographic lens systems, zoom lens systems having extremely high vari-focal ratios and images of relatively small sizes require optical systems which are bright and have high optical performance.

It is well known that such an optical system can be obtained by composing it of four lens units: in order from the object side, of a first lens unit having a positive power, a second lens unit which has a vari-focal function and a negative power, a third lens unit which serves for maintaining an image surface at a constant location during a change of a magnification and has a negative power, and fourth lens unit which has an imaging function and a positive power. However, such an optical system ordinarily has a large total length and can hardly meet the requirements recently imposed for configuring video cameras which are compact since an airspace must be reserved for moving the third lens unit, and the fourth lens unit is divided into a front sub-system which makes a diverging light bundle emerging from the third lens unit into a parallel light bundle and a rear sub-unit which images the light bundle.

In view of this fact, a zoom lens system is composed as a main trend these days, of four lens units, in order from the object side, a first lens unit having a positive power, a second lens unit which has a vari-focal function and a negative power, a third lens unit which has a positive power and is to be kept stationary during zooming, and a fourth lens unit which has a positive power and serves for correcting a deviation of an image surface caused by changing a magnification. Such a zoom lens system is configured to be focused by moving the fourth lens unit toward the object side.

Known as zoom lens systems of this type are conventional examples disclosed by Japanese Patents Kokai Publication Nos. Sho 62-178917, Sho 62-215225 and Sho 63123009.

Further, image pickup devices using picture elements having extremely small sizes are being developed for the purpose of offering compact image pickup devices usable for photographing the so-called highly precise and minute images such as those for displaying on high definition television. Since higher resolution is required for photographic lens systems as smaller picture elements are used for image pickup devices, the enhancement of optical performance of photographic lens systems is more strongly demanded.

Known as zoom lens systems satisfying such a demand are conventional examples disclosed by Japanese Patents Kokai Publication Nos. Sho 62-153913, Hei 1-126614 and Hei 6-56453.

It is general for obtaining high optical performance to properly cancel positive and negative aberrations produced by refracting surfaces with one another. In the case of a zoom lens system in which passage of rays and aberrations produced by refracting surfaces are largely different dependently on zoomed conditions, however, it is remarkably difficult to cancel aberrations produced by the refracting surfaces with one another at all focal lengths. When an attempt is made to shorten a total length of a zoom lens system which uses a zooming lens unit having a relatively simple composition, in particular, it is necessary to strengthen refractive powers of lens units, thereby allowing refracting surfaces to produce remarkable aberrations and making cancellation of aberrations much more difficult.

When the refractive power of the second lens unit is strengthened in an attempt to shorten the zoom lens system of the above-mentioned type (in which the four positive, negative, positive and positive lens units are disposed, and a negative refractive power is imparted only to the second lens unit having the vari-focal function, in particular) it is necessary to strengthen also the refractive power of the third lens unit or the fourth lens unit, thereby making it difficult to reserve a required back focal length or obtain high optical performance.

For obtaining a zoom lens system which has extremely high optical performance, high enough to accept highly precise and minute images, it is conceivable to reduce amounts of aberrations produced by refracting surfaces with an increased number of lens elements which refract rays at smaller angles and an increased number of times or cancel aberrations in a complicated way by selecting a complicated composition for a zooming lens unit. However, either of these conceptions has a defect resulting in the enlargement of the zoom lens system.

Each of the above-mentioned conventional examples disclosed by Japanese Patents Kokai Publication Nos. Sho 62-178917, Sho 62-215225 and Sho 63-123009 has a relatively simple composition and is remarkably compact, but exhibits optical performance insufficient as that of a photographic lens system for accepting the highly precise minute images such as those for high definition television. Further, each of the conventional examples disclosed by Japanese Patent Kokai Publication Nos. Sho 62-153913, Hei 1-126614 and Hei 6-56453 has extremely high optical performance, but cannot be said to be a sufficiently compact zoom lens system since it uses a large number of lens elements and is configured to cancel aberrations in a complicated way by using a zooming lens unit having a complicated composition.

For obtaining a compact zoom lens system which has high optical performance it is therefore desirable to select a zoom type advantageous for compact design of a lens system and contrive compositions of lens units without excessively strengthening refractive powers thereof. Speaking concretely, it is important to contrive, while selecting the composition of the above-mentioned zoom lens system composed of the four positive, negative, positive and positive lens units and contriving compositions of the third lens unit and the fourth lens unit without remarkably strengthening the refractive power of the second lens unit.

SUMMARY OF THE INVENTION

A primary object of the present invention is to provide a zoom lens system which is composed, in order from the object side, of a first lens unit having a positive refractive power, a second lens unit having a negative refractive power, a third lens unit having a positive refractive power and a fourth lens unit having a positive refractive power, wherein a magnification is changed mainly by covering the second lens unit monotonously along an optical axis, a location of an image surface is corrected mainly by moving the fourth lens unit in both directions along the optical axis, and the third lens unit and the fourth lens unit have characteristic compositions.

Another object of the present invention is to provide a zoom lens system which is composed, in order from the object side, of a first lens unit having a positive refractive power, a second lens unit having a negative refractive power, a third lens unit having a positive refractive power and a fourth lens unit having a positive refractive power, wherein a magnification is changed mainly by moving the second lens unit monotonously along an optical axis, a location of an image surface is corrected mainly by moving the fourth lens unit in both directions along the optical axis, and the first lens unit and the second lens unit have characteristic compositions.

The zoom lens system according to the present invention can be configured to have compositions roughly classified into the first through fifth compositions described below. The first through fourth compositions of the zoom lens system are characterized by compositions of the third and fourth lens units, whereas the fifth composition of the zoom lens system is characterized by compositions of the first and second lens units.

The zoom lens system according to the present invention which has the first composition consists, in order from the object side, of a first lens unit having a positive power, a second lens unit which has a negative power and is moved monotonously along an optical axis mainly for sharing a vari-focal function, a third lens unit having a positive power, and a fourth lens unit which has a positive power and is moved in both directions along the optical axis during zooming for correcting a deviation of an image surface; and is focused by moving the third lens unit, the fourth lens unit, a lens component or lens components disposed therein: the third lens unit being composed, in order from the object side, of a first positive lens component which comprises at least one positive lens element and a second negative lens component which comprises at least one negative lens element, and the fourth lens unit being composed, in order from the object side, of a first negative lens component which comprises at least a negative lens element and a second positive lens component which comprises at least one positive lens element. The zoom lens system according to the present invention is characterized in that it satisfies the following conditions (11), (12) and (13):

$$-0.80 < f_w/f_2 < -0.55 \quad (11)$$

$$-0.70 < f_4/f_{4N} < -0.30 \quad (12)$$

$$0.60 < f_{4P}/f_4 < 0.70 \quad (13)$$

wherein the reference symbols $f_w$, $f_2$, $f_4$, $f_{4N}$ and $f_{4P}$ represent focal lengths of the zoom lens system as a whole at a wide position thereof, the second lens unit, the fourth lens unit, the first negative lens component and the second positive lens component of the fourth lens unit respectively.

The zoom lens system according to the present invention which has the second composition consists, in order from the object side, of a first positive lens unit having a positive power, a second lens unit which has a negative power and is moved monotonously during zooming in both directions along the optical axis for sharing a vari-focal function, a third lens unit having a positive power, and a fourth lens unit which has a positive power and is moved during zooming in both directions mainly for correcting a deviation of an image surface caused due to a change of magnification; and is configured to be focused by moving the third lens unit, the fourth lens unit, a lens unit or lens units disposed therein: the third lens unit being composed, in order from the object side, of a first positive lens component which comprises at least one positive lens element, a second negative lens component which comprises at least one negative lens element and a third positive lens component which comprises at least one positive lens element, and the fourth lens unit being composed, in order from the object side, of a first positive lens component which comprises at least one positive lens element, a second negative lens component which comprises at least one negative lens element and a third lens component which comprises at least one positive lens element. This zoom lens system is characterized in that it satisfies the following conditions:

$$-0.67 < f_w/f_2 < -0.56 \quad (21)$$

$$-0.80 < f_w/f_{3N} < -0.30 \quad (22)$$

$$0.50 < f_{3P1}/f_{3P2} < 1.30 \quad (23)$$

$$-0.25 < f_w/f_{4N} < -0.04 \quad (24)$$

$$0.10 < f_{4P1}/f_{4P2} < 1.00 \quad (25)$$

wherein the reference symbols $f_{3N}$, $f_{3P1}$, $f_{3P2}$, $f_{4N}$, $f_{4P1}$, and $f_{4P2}$ represent focal lengths of the second negative lens component disposed in the third lens unit, the first positive lens component disposed in the third lens unit, the third positive lens component disposed in the third lens unit, the second negative lens component disposed in the fourth lens unit, the first positive lens component disposed in the fourth lens unit and the third positive lens component disposed in the fourth lens unit respectively.

The zoom lens system according to the present invention which has the third composition consists, in order from the object side, of a first lens unit having a positive power, a second lens unit which has a negative power and is moved during zooming in both directions along the optical axis mainly for sharing the vari-focal function, a third lens unit having a positive power, and a fourth lens unit which has a positive power and is moved in both directions for correcting a deviation of an image surface caused due to a change of magnification; and is configured to be focused by moving the third lens unit, The fourth lens unit, a lens component or lens components disposed therein: the third lens unit being composed, in order from the object side, of a first positive lens component which comprises at least one positive lens element, a second negative lens component which comprises at least one negative lens element and a third positive lens component which comprises at least one positive lens element and the fourth lens unit being composed, in order from the object side, of a first lens component which comprises at least one positive lens element and a second negative lens component which comprises at least one negative lens element. This zoom lens system is characterized in that it satisfies the following conditions:

$$-0.67 < f_w/f_2 < -0.50 \quad (31)$$

$$-0.67 < f_w/f_{3N} < -0.35 \quad (32)$$

$$0.50 < f_{3P1}/f_{3P2} < 2.00 \quad (33)$$

$$-0.40 < f_w/f_{4N} < -0.10 \quad (34)$$

wherein the reference symbols $f_{3N}$, $f_{3P1}$, $f_{3P2}$ and $f_{4N}$ represent focal lengths of the second negative lens component disposed in the third lens unit, the first positive lens component disposed on the object side in the third lens unit, the third positive lens component disposed on the image side in the third lens unit and the second negative lens component disposed in the fourth lens unit respectively.

The zoom lens system according to the present invention which has the fourth composition consists, in order from the object side, of a first lens unit having a positive power, a second lens unit which has a negative power and is moved monotonously during zooming along the optical axis mainly for sharing the vari-focal function, a third lens unit having a positive power, and a fourth lens unit which has a positive power and is moved during zooming in both directions for correcting a deviation of an image surface caused due to a change of magnification; and is configured to be focused by moving the third lens unit, the fourth lens unit, a lens component or lens components disposed therein: the third lens unit being composed, order from the object side, of a first positive lens component which comprises at least one positive lens element and a second negative lens component which comprises at least one negative lens element, and the fourth lens unit being composed, in order from the object side, of a first positive lens component which comprises at least one positive lens element and a second negative lens component which comprises at least one negative lens element. This zoom lens system is characterized in that it satisfies the following conditions:

$$-0.65 < f_W/f_2 < -0.50 \quad (41)$$

$$0.20 < f_{3P}/f_3 < 0.40 \quad (42)$$

$$-0.60 < f_{3N}/f_3 < -0.10 \quad (43)$$

wherein the reference symbols $f_3$, $f_{3P}$ and $f_{3N}$ represent a focal length of the third lens unit, a total focal length of the positive lens currents disposed in the third lens unit and a focal length of the second negative lens component disposed in the third lens unit.

When the zoom lens system according to the present invention has the fifth composition, it consists, in order from the object side, of a first lens unit having a positive power, a second lens unit which has a negative power and is moved monotonously during zooming along the optical axis mainly for sharing the vari-focal function, a third lens unit having a positive power, and a fourth lens unit which has a positive power and is moved during zooming in both the directions for correcting a deviation of an image surface caused due to zooming; and is configured to be focused by moving the third lens unit, the fourth lens unit, a lens component or lens components disposed therein: the first lens unit being composed, in order from the object side, of a first negative meniscus lens component which has a convex surface on the object side and a second lens component which comprises at least one positive lens element, and the second lens unit being composed, in order from the object side, of a first negative lens component which comprises a negative lens element having an image side surface having higher curvature and a negative lens element, and a second lens component which comprises a positive lens element having an object side surface having higher curvature. This zoom lens system is characterized in that it satisfies the following conditions:

$$0.13 < f_W/f_1 < 0.18 \quad (51)$$

$$-0.83 < f_W/f_2 < -0.53 \quad (52)$$

$$0.20 < 1/SF_{1N} < 0.30 \quad (53)$$

$$0.70 < 1/SF_{2N} < 1.30 \quad (54)$$

$$-0.80 < 1/SF_{2P} < -0.25 \quad (55)$$

wherein the reference symbols $f_W$, $f_1$, $f_2$, $SF_{1N}$, $SF_2N$ and $SF_{2P}$ represent a focal length of the zoom lens system as a whole at a wide position thereof, a focal length of the first lens unit, a focal length of the second lens unit, a shaping factor for the negative meniscus lens component disposed on the object side in the first lens unit, a shaping factor for the negative tans element disposed on the object side in the second lens unit and a shaping factor for the positive lens element disposed on the image side in the second lens unit respectively.

DETAILED DESCRIPTION OF THE PREFERRED EMBODIMENTS

Figure 1:
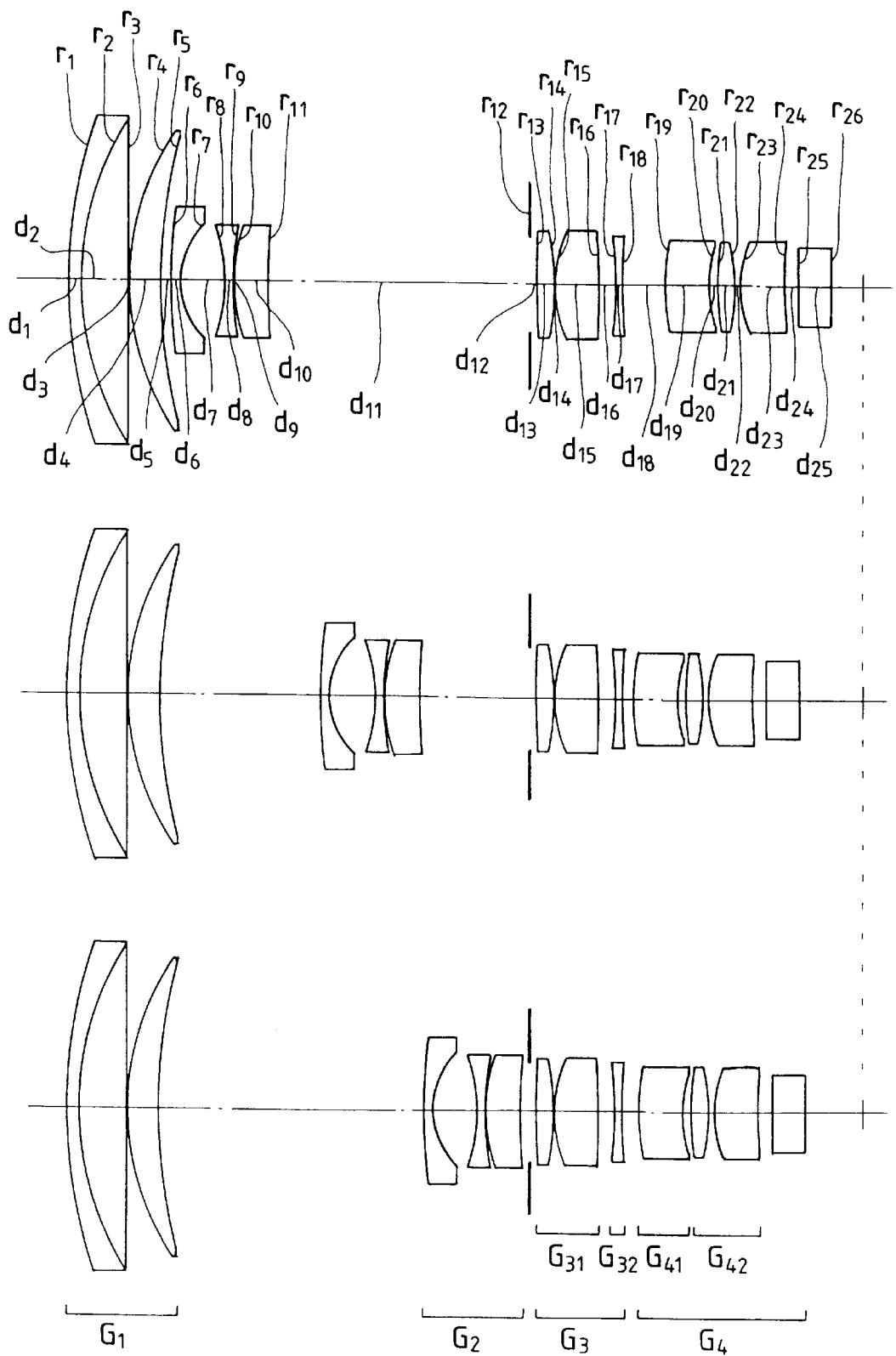
FIGS. 1 though 8 are sectional views illustrating compositions of first through eighth embodiments of the zoom lens system according to the present invention respectively.
Figure 2:
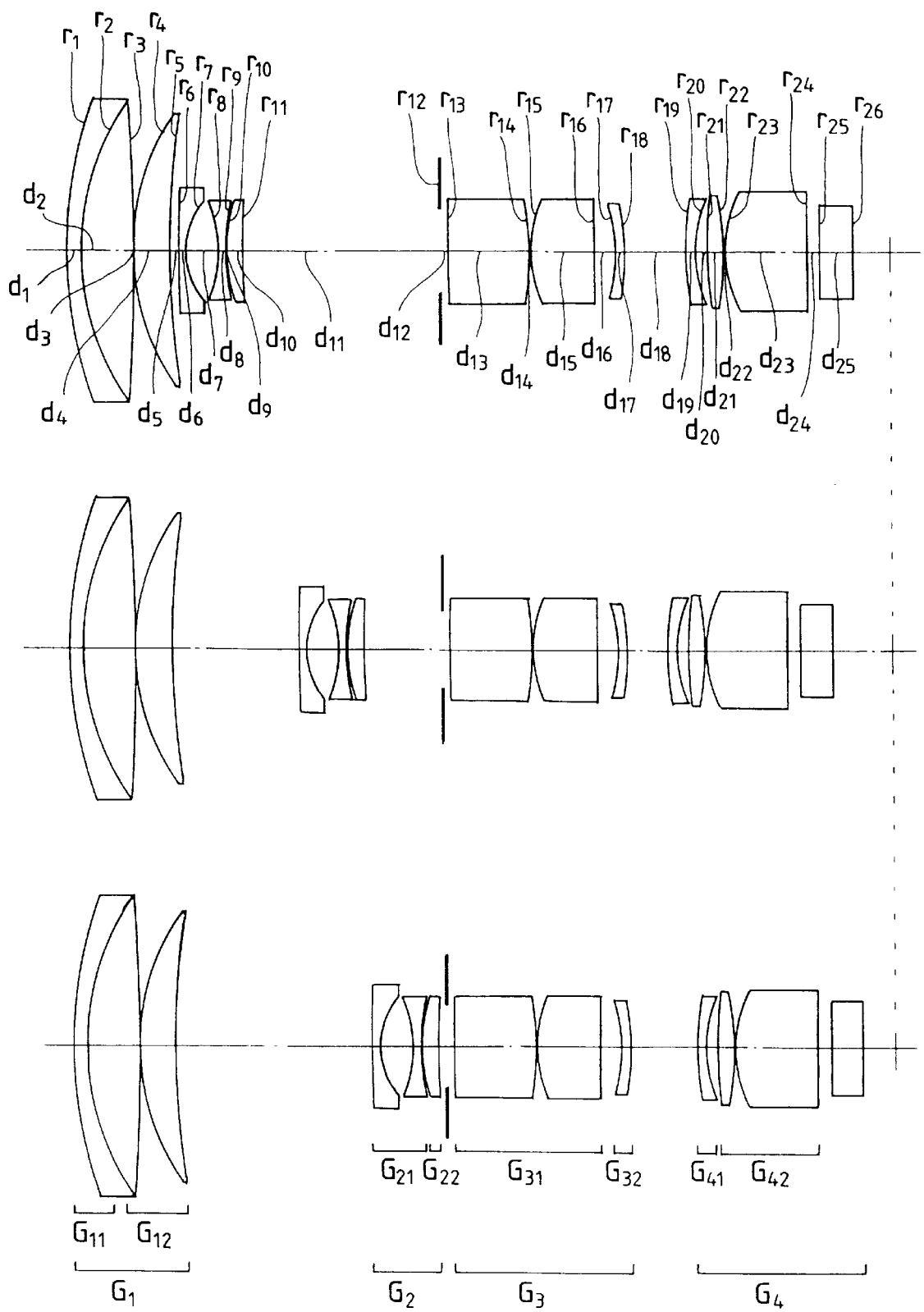

As illustrated in FIGS. 1 and 2, the zoom lens system according to the present invention which has the first composition consists, in order from the object side, of a first lens unit $G_1$ having a positive power, a second lens unit $G_2$ which has a negative power and is moved during zooming monotonously along an optical axis mainly for sharing a vari-focal function, a third lens unit $G_3$ having a positive power, and a fourth lens unit $G_4$ which has a positive power and is moved during zooming in both directions for correcting a deviation of an image surface; and is configured to be focused by moving the third lens unit, the fourth lens unit, a lens component or lens components disposed therein. The third lens unit $G_3$ is composed, in order from the object side, of a first positive lens component $G_{31}$ which comprises at least one positive lens element and a second negative lens component $G_{32}$ which comprises at least one negative lens element, and the fourth lens unit $G_4$ which is composed, in order from the object side, of a first negative lens component $G_{41}$ which comprises at least one negative lens element and a second positive lens component $G_{42}$ which comprises at least one positive lens element. This zoom lens system is characterized in that it satisfies the following conditions (11), (12) and (13):

$$-0.80 < f_W/f_2 < -0.55 \quad (11)$$

$$-0.70 < f_4/f_{4N} < -0.30 \quad (12)$$

$$0.60 < f_{4P}/f_4 < 0.70 \quad (13)$$

The condition (11) defines a refractive power of the second lens unit. If $f_W/f_2$ has a large value exceeding the upper limit of the condition (11), the second lens unit will have an insufficient negative refractive power, thereby making it difficult to configure the zoom lens system compactly and reserve a required back focal length even by contriving compositions of the other lens units. If $f_W/f_2$ has a small value below the lower limit of the condition (11), in contrast, it is advantageous for configuring the zoom lens compactly and reserving the required back focal length, but the positive refractive power of the fourth lens unit must be strengthened, thereby aggravating aberrations and making it impossible to maintain high optical performance.

Further, the third lens unit is composed, in order from the object side, of a first lens component consisting of two positive lens elements and a second lens component consisting of a negative lens element, whereas the fourth lens unit is composed, in order from the object side, of a first lens component consisting of a negative lens element and a second lens component consisting of two positive lens elements: these third and fourth lens units having a function to image a diverging light bundle emerging from the second lens unit. The fourth lens unit has a refractive power stronger than that of the third lens unit for reserving the required back focal length. The first negative lens component and the second positive lens component composing the fourth lens unit are configured to satisfy the conditions (12) and (13). If $f_4/f_{4N}$ has a small value exceeding the lower limit of the condition (12) or $f_{4P}/f_4$ has a small value exceeding the lower limit of the condition (13), the fourth lens unit will have a strongly retro-focus type refractive power distribution, which is advantageous for reserving the required back focal length, but aggravates spherical aberration or astigmatism and undesirably allows rays to be varied remarkably, thereby producing aberrations of high orders. If $f_4/f_{4N}$ has a large value exceeding the upper limit of the condition (12) or $f_{4P}/f_4$ has a large value exceeding the upper limit of the condition (13), in contrast, it will be difficult to reserve the required back focal length, and correct spherical aberration and coma.

For the zoom lens system according to the present invention which has the first composition described above, it is desirable to configure the first lens unit so as to comprise, in order from the object side, a first lens component consisting of a negative meniscus lens element having a convex surface on the object side and a second lens component comprising at least one positive lens element, and satisfy the following condition (14):

$$0.0 < 1/SF_{1N} < 0.42 \tag{14}$$

wherein the reference symbol $SF_{1N}$ represents the shaping factor SF for the negative meniscus lens element disposed in the first lens unit.

The shaping factor SF is expressed by the following formula:

$$SF = (r_a + r_b)/(r_a - r_b)$$

The condition (14) defines a shape of the negative lens element disposed in the first lens unit. If $1/SF_{1N}$ has a large value exceeding the upper limit of the condition (14), positive astigmatism will be remarkable at the wide position, and positive spherical aberration, negative coma and positive astigmatism will be aggravated at a tele position. If $1/SF_{1N}$ has a small value exceeding the lower limit of the condition (14), negative spherical aberration and positive coma will undesirably be remarkable at the tele position.

For the zoom lens system according to the present invention which has the first composition, it is desirable to compose the second lens unit of a lens component consisting, in order from the object side, of a negative lens element having higher curvature on an image side surface thereof, a negative lens element and a positive lens element which is disposed the image side and has higher -curvature on an object side surface thereof, and configure the lens unit so as to satisfy the following conditions (15) and (16):

$$0.65 < 1/SF_{2N} < 1.80 \tag{15}$$

$$-1.00 < 1/SF_{2P} < -0.30 \tag{16}$$

wherein the reference symbol $SF_{2N}$ represents a shaping factor for the negative lens element disposed on the object side in the second lens unit and the reference symbol $SF_{2P}$ designates a shaping factor for the positive lens element disposed on the image side in the second lens unit.

The condition (15) defines a shape for the negative lens element disposed on the object side in the second lens unit. If $1/SF_{2N}$ has a large value exceeding the upper limit of the condition (15), negative distortion and positive astigmatism will be aggravated at the wide position, and spherical aberration and positive astigmatism will be aggravated at the tele position. If $1/SF_{2N}$ has a small value below the lower limit of the condition (15), it will undesirably aggravate positive astigmatism and negative distortion at the wide position as well as positive spherical aberration and negative astigmatism at the tele position. Further, the condition (16) defines a shape for the positive lens element disposed on the image side in the second lens unit. If $1/SF_{2P}$ has a large value exceeding the upper limit of the condition (16), negative astigmatism will be remarkable at the wide position and negative spherical aberration will be aggravated at the tele position. If $1/SF_{2P}$ has a small value below the lower limit of the condition (16), it will undesirably aggravate positive astigmatism at the wide position and positive spherical aberration at the tele position.

Now, description will be made of first and second embodiments of the zoom lens system according to the present invention which has the first composition. The first embodiment has numerical data listed below:

first embodiment $f = 9.111 \sim 25.460 \sim 71.784, F = 2.0,$
$2\omega = 50.05° \sim 18.29° \sim 6°42'$ $r_1 = 73.7539$
$d_1 = 2.0000$  $n_1 = 1.81264$  $v_1 = 25.43$
$r_2 = 45.5015$
$d_2 = 6.7348$  $n_2 = 1.57098$  $v_2 = 71.30$
$r_3 = 5906.5945$
$d_3 = 0.1000$
$r_4 = 37.5124$
$d_4 = 4.7882$  $n_3 = 1.57098$  $v_3 = 71.30$
$r_5 = 85.2972$
$d_5 = D1$ (variable)
$r_6 = 92.0724$
$d_6 = 1.2000$  $n_4 = 1.60548$  $v_4 = 60.70$
$r_7 = 10.8422$
$d_7 = 6.7907$
$r_8 = -22.5869$
$d_8 = 1.2000$  $n_5 = 1.60548$  $v_5 = 60.70$
$r_9 = 43.6931$
$d_9 = 0.1500$
$r_{10} = 24.6146$
$d_{10} = 5.0000$  $n_6 = 1.84281$  $v_6 = 21.00$
$r_{11} = 85.1768$
$d_{11} = D2$ (variable)
$r_{12} = \infty$ (stop)
$d_{12} = 1.0000$
$r_{13} = 121.6395$
$d_{13} = 2.5000$  $n_7 = 1.60520$  $v_7 = 65.48$
$r_{14} = -40.0294$
$d_{14} = 0.1500$
$r_{15} = 19.9110$
$d_{15} = 6.5000$  $n_8 = 1.60520$  $v_8 = 65.48$
$r_{16} = -249.2357$
$d_{16} = 2.5770$
$r_{17} = -42.6270$
$d_{17} = 1.0000$  $n_9 = 1.85504$  $v_9 = 23.78$
$r_{18} = 75.3501$
$d_{18} = D3$ (variable)
$r_{19} = 35.5656$
$d_{19} = 6.5006$  $n_{10} = 1.67158$  $v_{10} = 33.04$
$r_{20} = 16.8551$
$d_{20} = 1.3634$
$r_{21} = 45.5948$
$d_{21} = 2.500$  $n_{11} = 1.60520$  $v_{11} = 65.48$
$r_{22} = -34.5358$
$d_{22} = 0.8734$
$r_{23} = 15.7466$
$d_{23} = 6.5000$  $n_{12} = 1.60520$  $v_{12} = 65.48$
$r_{24} = 44.1299$
$d_{24} = 2.0000$
$r_{25} = \infty$ -continued $$f = 9.111 \sim 25.460 \sim 71.784, F = 2.0,$$
$$2\omega = 50.05° \sim 18.29° \sim 6\ 42°$$

| $d_{25}$ = 5.0000 | | $n_{13}$ = 1.51825 | $\nu_{13}$ = 64.15 |
|---|---|---|---|
| $r_{26}$ = ∞ | | | |
| f | 9.1114 | 25.4599 | 71.7835 |
| $D_1$ | 1.5000 | 23.9493 | 38.8934 |
| $D_2$ | 38.8934 | 16.4476 | 1.5000 |
| $D_3$ | 6.3241 | 1.5942 | 2.5239 |

$f_W/f_2 = -0.643$, $f_4/f_{4N} = -0.480$, $f_{4P}/f_4 = 0.651$,
$1/SF_{1N} = 0.237$, $1/SF_{2N} = 0.789$, $1/SF_{2P} = -0.552$,
$1/SF_{4N} = 0.357$ wherein the reference symbols $r_1$, $r_2$, . . . represent radii of curvature on surfaces of respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements for the e-line, the reference symbols $\nu_1$, $\nu_2$, . . . represent Abbe's numbers of the respective lens elements, the reference symbol $2\omega$ designates a field angle, and the reference symbol F denotes an F number.

The first embodiment described has a composition illustrated in FIG. 1, or is composed, in order from the object side of a first lens unit $G_1$ having a positive refractive power, a second lens unit $G_2$ which has a negative refractive power and is moved during zooming monotonously along an optical axis for changing a magnification, a third lens unit $G_3$ having a positive refractive power and a fourth lens unit $G_4$ which has a positive refractive power and is moved during zooming in both directions along the optical axis for correcting a location of an image surface. The first lens unit consists, in order from the object side, of a negative meniscus lens element having a convex surface on the object side and two positive lens elements having high curvature on an object side surfaces thereof, whereas the second lens unit is composed, in order from the object side, of a negative lens element having higher curvature on an image side surface thereof, a negative lens element and a positive lens element having higher curvature on an object side surface thereof. The second lens unit maintains the refractive power thereof so as to satisfy the above-mentioned condition (11).

The third lens unit is composed, in order from the object side of a first lens component $G_{31}$ consisting of two positive lens elements and a second lens component $G_{32}$ consisting of a negative lens element, whereas the fourth lens unit is composed, in order from the object side, of a first lens component $G_{41}$ consisting of a negative lens element and a second lens component $G_{42}$ consisting of two positive lens elements. The third lens unit and the fourth lens unit have functions to image a diverging light bundle emerging from the second lens unit, and the fourth lens unit has a refractive power stronger than that of the third lens unit for reserving a required back focal length. The first negative lens component $G_{41}$ and the second positive lens component $G_{42}$ of the fourth lens unit are configured so as to satisfy the conditions (12) and (13).

Further, the negative lens element disposed on the object side in the first lens unit is configured so as to satisfy the above-mentioned condition (14).

The negative lens element and the positive lens element disposed on the object side and the image side in the second lens unit are configured so as to satisfy the above-mentioned conditions (15) and (16) respectively.

For maintaining high optical performance of the zoom lens system which has the first composition, it is desirable to satisfy condition (11-1) shown below in place of the condition (11), condition (12-1) in place of the condition (12) or condition (13-1) in place of the condition (13):

$$-0.75 < f_W/f_2 < -0.63 \tag{11-1}$$

$$-0.65 < f_4/f_{4N} < -0.40 \tag{12-1}$$

$$0.62 < f_{4P}/f_4 < 0.68 \tag{13-1}$$

Though the negative lens element disposed on the object side in the first lens unit is configured to satisfy the condition (14) as described above, it is desirable for obtaining higher optical performance to configure this lens element so as to satisfy the following condition (14-1) in place of the condition (14):

$$0.2 < 1/SF_{1N} < 0.3 \tag{14-1}$$

Though the negative lens element and the positive element disposed on the object side and the image side in the second lens unit satisfy the conditions (15) and (16) respectively, it is desirable for obtaining higher optical performance to satisfy condition (15-1) mentioned below in place of the condition (15) or condition (16-1) in place of the condition (16):

$$0.65 < 1/SF_{2N} < 1.30 \tag{15-1}$$

$$-0.80 < 1/SF_{2P} < -0.40 \tag{16-1}$$

For the zoom lens system according to the present invention, it is desirable to configure the negative lens element disposed on the object side in the fourth lens unit so as to satisfy the following condition (17):

$$0.20 < 1/SF_{4N} < 1.00 \tag{17}$$

wherein the reference symbol $SF_{4N}$ represents a shaping factor for the negative lens element disposed on the object side in the fourth lens unit.

The condition (17) defines a shape for the negative lens element disposed on the object side-in the fourth lens unit. If $1/SF_{4N}$ has a large value exceeding the upper limit of the condition (17), negative astigmatism will be aggravated in a range from the wide position to the tele position. If $1/SF_{4N}$ has a small value exceeding the lower limit of the condition (17), positive spherical aberration and positive astigmatism will undesirably be remarkable in the range from the wide position to the tele position.

Further, it is desirable for maintaining the high optical performance to satisfy condition (17-1) in place of the condition (17):

$$0.30 < 1/SF_{4N} < 0.60 \tag{17-1}$$

The second embodiment of the zoom lens system according to the present invention which has the first composition is configured with the following numerical data:

second embodiment $$f = 9.126 \sim 25.454 \sim 71.982, F = 2.0,$$
$$2\omega = 49.84° \sim 17.95° \sim 6.25°$$

| $r_1$ = 69.7910 | | |
|---|---|---|
| $d_1$ = 2.0000 | $n_1$ = 1.81264 | $\nu_1$ = 25.43 |
| $r_2$ = 41.0696 | | |
| $d_2$ = 7.8005 | $n_2$ = 1.57098 | $\nu_2$ = 71.30 |
| $r_3$ = −402.1761 | | |

-continued f = 9.126 ~ 25.454 ~ 71.982, F = 2.0,
2ω = 49.84° ~ 17.95° ~ 6.25°

| | | |
|---|---|---|
| $d_3$ = 0.1000 | | |
| $r_4$ = 33.8895 | | |
| $d_4$ = 5.3665 | $n_3$ = 1.57098 | $v_3$ = 71.30 |
| $r_5$ = 119.1882 | | |
| $d_5$ = D1 (variable) | | |
| $r_6$ = 308.9133 | | |
| $d_6$ = 1.2000 | $n_4$ = 1.73234 | $v_4$ = 54.68 |
| $r_7$ = 11.4798 | | |
| $d_7$ = 4.9238 | | |
| $r_8$ = -18.1393 | | |
| $d_8$ = 1.2000 | $n_5$ = 1.51905 | $v_5$ = 69.56 |
| $r_9$ = 34.2351 | | |
| $d_9$ = 0.1500 | | |
| $r_{10}$ = 23.8419 | | |
| $d_{10}$ = 2.5000 | $n_6$ = 1.84281 | $v_6$ = 21.00 |
| $r_{11}$ = 103.2619 | | |
| $d_{11}$ = D2 (variable) | | |
| $r_{12}$ = ∞ (stop) | | |
| $d_{12}$ = 1.0000 | | |
| $r_{13}$ = 431.8399 | | |
| $d_{13}$ = 12.5000 | $n_7$ = 1.67279 | $v_7$ = 57.33 |
| $r_{14}$ = -50.3196 | | |
| $d_{14}$ = 0.1500 | | |
| $r_{15}$ = 18.6805 | | |
| $d_{15}$ = 9.8589 | $n_8$ = 1.43985 | $v_8$ = 94.97 |
| $r_{16}$ = 847.0418 | | |
| $d_{16}$ = 3.1334 | | |
| $r_{17}$ = -25.0553 | | |
| $d_{17}$ = 1.5000 | $n_9$ = 1.85504 | $v_9$ = 23.78 |
| $r_{18}$ = -41.4964 | | |
| $d_{18}$ = D3 (variable) | | |
| $r_{19}$ = 48.2049 | | |
| $d_{19}$ = 1.5000 | $n_{10}$ = 1.81675 | $v_{10}$ = 22.62 |
| $r_{20}$ = 19.1868 | | |
| $d_{20}$ = 1.7705 | | |
| $r_{21}$ = 61.5311 | | |
| $d_{21}$ = 2.5000 | $n_{11}$ = 1.67279 | $v_{11}$ = 57.33 |
| $r_{22}$ = -49.5960 | | |
| $d_{22}$ = 0.1500 | | |
| $r_{23}$ = 17.4781 | | |
| $d_{23}$ = 12.5000 | $n_{12}$ = 1.69979 | $v_{12}$ = 55.52 |
| $r_{24}$ = 221.9526 | | |
| $d_{24}$ = 2.0000 | | |
| $r_{25}$ = ∞ | | |
| $d_{25}$ = 5.0000 | $n_{13}$ = 1.51825 | $v_{13}$ = 64.15 |
| $r_{26}$ = ∞ | | |

| f | 9.1259 | 25.4540 | 71.9821 |
|---|---|---|---|
| $D_1$ | 1.5000 | 19.9170 | 30.5474 |
| $D_2$ | 30.5474 | 12.1320 | 1.5000 |
| $D_3$ | 9.6562 | 6.2532 | 10.3792 |
| $D_3'$ | 9.5677 | 5.6562 | 6.2060 |

$f_W/f_2$ = -0.751, $f_4/f_{4N}$ = -0.622, $f_{4P}/f_4$ = 0.650,
$1/SF_{1N}$ = 0.259, $1/SF_{2N}$ = 0.928, $1/SF_{2P}$ = -0.625,
$1/SF_{4N}$ = 0.431

The second embodiment has a composition illustrated in FIG. 2 or similar to that of the first embodiment, and is configured to be focused by moving the fourth lens unit toward the object side. Accordingly, an airspace is reserved between the third lens unit and the fourth lens unit, and a difficulty to reserve the required back focal length is compensated by weakening the refractive power of the third lens unit and strengthening the refractive power of the fourth lens unit. The reference symbol $D_3'$ used in the numerical data represents the airspace reserved between the third lens unit and the fourth lens unit when the zoom lens system is focused on an object located at a distance of 1 m.

When a lens unit which has a function to correct a deviation of an image surface caused by zooming as in the case of the second embodiment, a large variation is caused by focusing unless astigmatism in particular is not corrected. It is therefore desirable for the second embodiment that the fourth lens unit, or a lens unit to be moved for focusing a zoom lens system in general, at least one positive lens element which has thickness d satisfying the following condition (18) for preventing astigmatism from being aggravated:

$$0.7 < d/f_W < 2.0 \tag{18}$$

If all positive lens elements disposed in the focusing lens unit have a small value of $d/f_W$ exceeding the lower limit of the condition (18), it will be difficult to correct astigmatism and the image surface will undesirably be varied remarkably by zooming or focusing. If all positive lens elements disposed in the focusing lens unit have a large value of $d/f_W$ exceeding the upper limit of the condition (18), the lens elements can hardly be manufactured in practice and will be heavy thereby undesirably requiring a strong driving power.

For suppressing production of astigmatism in particular, it is desirable to satisfy the following condition (18-1) in place of the condition (18):

$$1.0 < d/f_W < 2.0 \tag{18-1}$$

The second embodiment which satisfies the conditions mentioned above maintains high optical performance and allows aberrations to be varied little by focusing.

The planar glass plate disposed on the image side of the lens system in each of the first embodiment and the second embodiment represents a low pass filter, an infrared cut filter and so on which are used for preventing moiré.

It is apparent that the present invention is effective not only for the focusing mode using the fourth lens unit adopted for these embodiments but also another focusing mode using the third lens unit, a lens component or lens components disposed in the third lens unit or the fourth lens unit.

Figure 3:
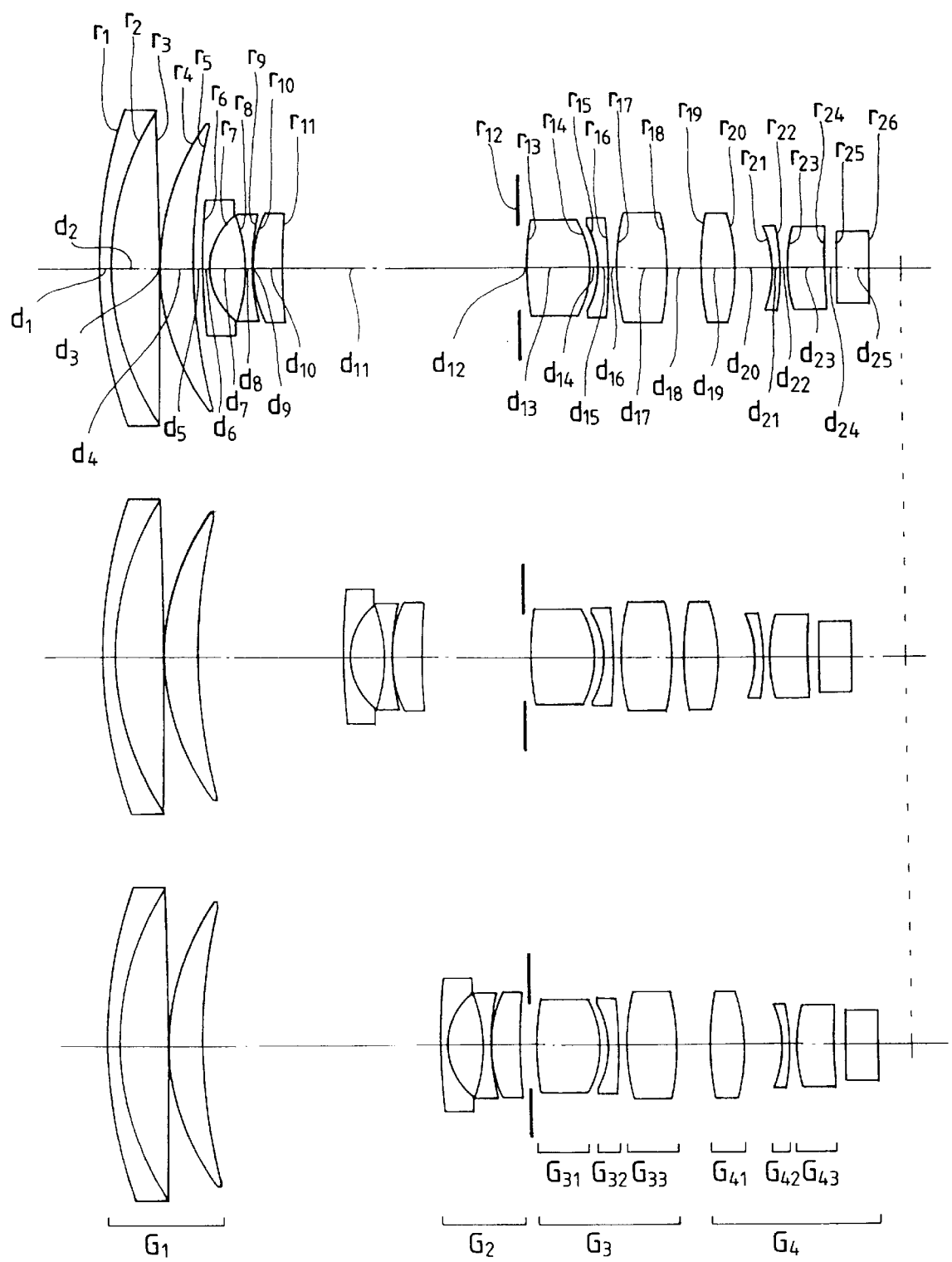
Figure 4:
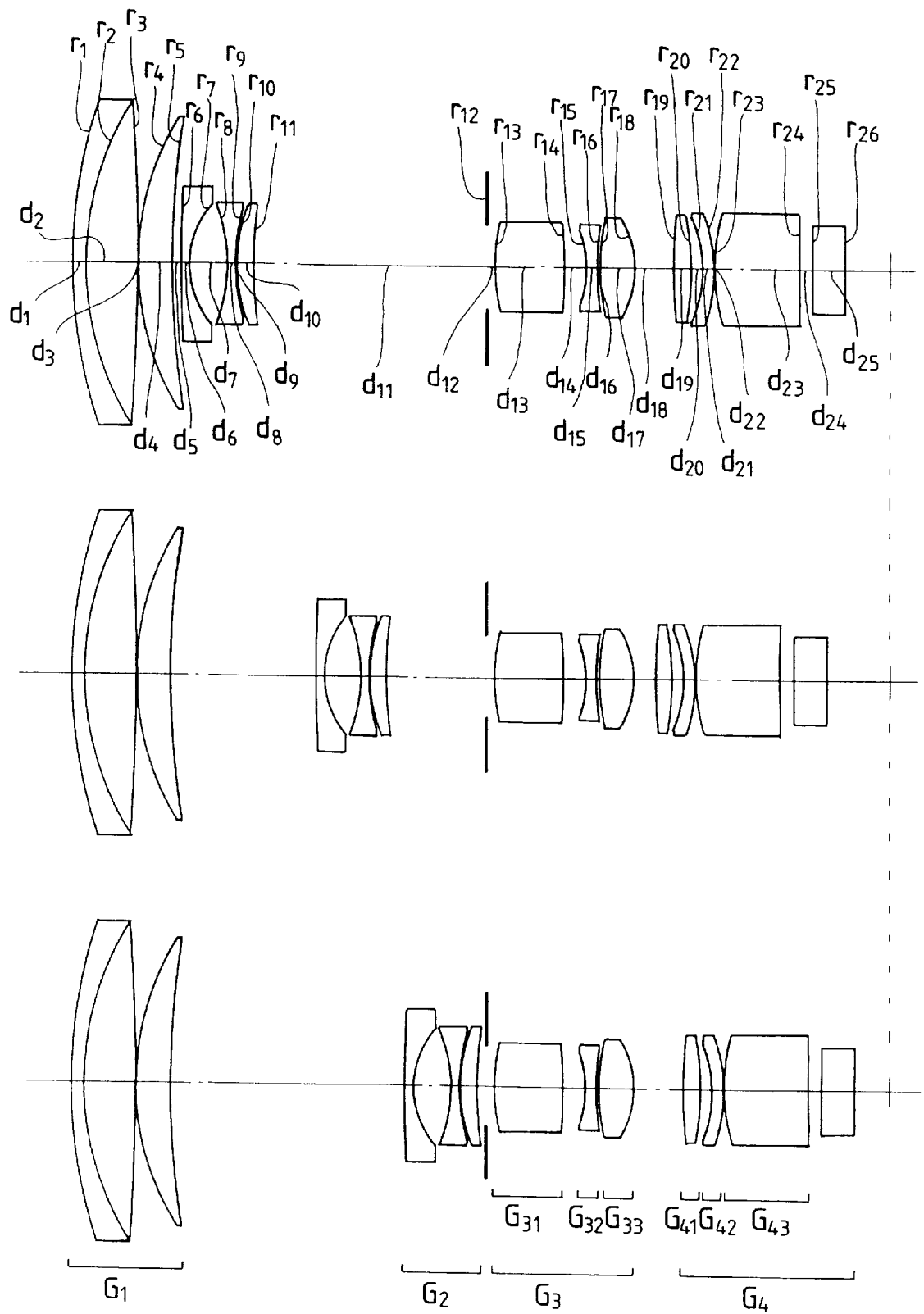

The zoom lens system according to the present invention which has the second composition is illustrated in FIG. 3 and FIG. 4, wherein the zoom lens system is composed, in order from the object side, of a first lens unit $G_1$ having a positive power, a second lens unit $G_2$ which has a negative refractive power and is moved during zooming, monotonously in both the directions along the optical axis for sharing a main vari-focal function, a third lens unit $G_3$ having a positive power, and a fourth lens unit $G_4$ which has a positive power and is moved during zooming in both directions for correcting a deviation of an image surface caused by changing a magnification; and configured to be focused by moving the third lens unit $G_3$, the fourth lens unit $G_4$, a lens unit or lens component disposed therein: the third lens unit $G_3$ being composed, in order from the object side, of a first lens component $G_{31}$ which comprises at least one positive lens element, a second lens component $G_{32}$ which comprises at least one negative lens element and a third lens component $G_{33}$ which comprises at least one positive lens element, whereas the fourth lens unit $G_4$ being composed, in order from the object side, of a first lens component $G_{41}$ which comprises at least one positive lens element, a second lens component $G_{42}$ which comprises at least one negative lens element and a third lens component $G_{43}$ which comprises at least one positive lens element. This zoom lens system is characterized in that it satisfies the conditions enumerated below:

$$-0.67 < f_W/f_2 < -0.56 \tag{21}$$

$$-0.80 < f_W/f_{3N} < -0.30 \tag{22}$$

$$0.50 < f_{3P1}/f_{3P2} < 1.30 \tag{23}$$

$$-0.25 < f_W/f_{4N} < -0.04 \tag{24}$$

$$0.10 < f_{4P1}/f_{4P2} < 1.00 \tag{25}$$

The condition (21) defines a refractive power for the second lens unit. If $f_W/f_2$ has a large value exceeding the upper limit of the condition (21), the second lens unit will have an insufficient negative refractive power, thereby making it difficult to configure the zoom lens system compactly and reserve a required back focal length even by contriving compositions of the other lens units. If $f_W/f_2$ has a small value below the lower limit of the condition (21), in contrast, it is advantageous for reserving the required back focal length, but the positive refractive power of the fourth lens unit must be strengthened, thereby aggravating aberrations and making it impossible to maintain high optical performance.

For reserving the required back focal length, the fourth lens unit has a refractive power stronger than that of the third lens unit though each of these lens units is composed, in order from the object side, of the first positive lens component, the second negative lens component and the third positive lens component, and has the function to image the diverging light bundle emerging from the second lens unit. For reserving high optical performance and the required back focal length, the first and third positive lens components and the second negative lens component of the third lens unit are configured so as to satisfy the above-mentioned conditions (22) and (23), and the first and third positive lens components and the second negative lens component of the fourth lens unit are configured so as to satisfy the conditions (24) and (25).

The condition (22) defines a refractive power for the second negative lens component of the third lens unit. If $f_W/f_{3N}$ has a small value below the lower limit of the condition (22), it will be difficult to correct spherical aberration, positive spherical aberration remarkable in particular at the tele position. If $f_W/f_{3N}$ has a large value exceeding the upper limit of the condition (22), in contrast, it will be difficult to correct negative spherical aberration and astigmatism produced by the first and third lens components with the second negative lens component. The condition (23) defines a refractive power distribution between the first lens component and the third lens component disposed on the object side and the image side in the third lens unit. If $f_{3P1}/f_{3P2}$ has a small value below the lower limit of the condition (23), it will be difficult to reserve the required back focal length and spherical aberration will be aggravated. If $f_{3P1}/f_{3P2}$ has a large value exceeding the upper limit of the condition (23), spherical aberration will be aggravated and it will undesirably be difficult to correct astigmatism.

The condition (24) defines a refractive power for the second lens component of the fourth lens unit. If $f_W/f_{4N}$ has a small value below the lower limit of the condition (24), it will aggravate positive astigmatism in the range from the wide position to the tele position, and positive spherical aberration and positive coma at the tele position which can hardly be corrected with the other lens unit. If $f_W/f_{4N}$ has a large value exceeding the upper limit of the condition (24), in contrast, it will be difficult to correct negative spherical aberration, negative coma and astigmatism produced by the first and third positive lens components with the second negative lens component. The condition (25) defines a refractive power distribution between the first and third positive lens components of the fourth lens unit. If $f_{4P1}/f_{4P2}$ has a small value below the lower limit of the condition (25), it will be difficult to reserve the required back focal length and the first lens component disposed on the object side on which paraxial rays are high will have a strong refractive power, thereby remarkably producing negative spherical aberration. If $f_{4P1}/f_{4P2}$ has a large value exceeding the upper limit of the condition (25), spherical aberration will be produced remarkably and it will undesirably be difficult to correct astigmatism.

For maintaining high optical performance of the zoom lens system according to the present invention, it is desirable to satisfy condition (22-1) mentioned below in place of the condition (22), condition (23-1) mentioned below in place of the condition (23) or condition (24-1) mentioned below in place of the condition (24):

$$-0.70 < f_W/f_{3N} < -0.35 \tag{22-1}$$

$$0.65 < f_{3P1}/f_{3P2} < 1.25 \tag{23-1}$$

$$-0.22 < f_W/f_{4N} < -0.06 \tag{24-1}$$

Further, it is desirable to configure the negative lens element to be disposed on the object side in the first lens unit so as to satisfy the following condition (26):

$$0.06 < 1/SF_{1N} < 0.45 \tag{26}$$

The condition (26) defines a shape for the negative lens element disposed on the object side in the first lens unit. If $1/SF_{1N}$ has a large value exceeding the upper limit of the condition (26), positive astigmatism and negative distortion will be remarkable at the wide position, and positive spherical aberration, negative coma and positive astigmatism will be aggravated at the tele posit Lion. If $1/SF_{1N}$ has a small value below the lower limit of the condition (26), negative spherical aberration, positive coma and negative astigmatism will undesirably be remarkable at the tele position.

For obtaining higher optical performance, it is desirable to satisfy the following condition (26-1) in place of the condition (26):

$$0.10 < 1/SF_{1N} < 0.28 \tag{26-1}$$

Furthermore, it is desirable that the negative lens element disposed on the object side in the second lens unit satisfies the following condition (27) and that the positive lens element disposed on the image side of the second lens unit satisfies the following condition (28):

$$0.50 < 1/SF_{2N} < 3.0 \tag{27}$$

$$-1.0 < 1/SF_{2P} < -0.2 \tag{28}$$

The condition (27) defines a shape for the negative lens element disposed on the object side in the second lens unit. If $1/SF_{2N}$ has a large value exceeding the upper limit of the condition (27), positive astigmatism and negative distortion will be remarkable at the wide position, and it will be difficult to correct spherical aberration and positive astigmatism at the tele position. If $1/SF_{2N}$ has a small value below the lower limit of the condition (27), it will undesirably aggravate positive astigmatism and negative distortion at the wide position, and positive spherical aberration, negative astigmatism and coma at the tele position. The condition (28) defines a shape for the positive lens element disposed on the image side in the second lens unit. If $1/SF_{2P}$ has a large value exceeding the upper limit of the condition (28), negative astigmatism and positive coma will be remarkable at the wide position and it will be difficult to correct negative spherical aberration at the tele position. If $1/SF_{2P}$ has a small value below the lower limit of the condition (28), positive spherical aberration will undesirably be aggravated at the tele position.

For obtaining higher optical performance, it is desirable to satisfy the following condition (27-1) in place of the condition (27) or the following condition (28-1) in place of the condition (28):

$$0.6 < 1/SF_{2N} < 1.4 \quad (27\text{-}1)$$

$$-0.7 < 1/SF_{2P} < -0.3 \quad (28\text{-}1)$$

It is desirable that the second negative lens component disposed in the fourth lens unit comprises a negative lens element satisfying the following condition (29):

$$-0.4 < 1/SF_{4N} < -0.1 \quad (29)$$

wherein the reference symbol $SF_{4N}$ represents a shaping factor for the negative element to be disposed in the fourth lens unit.

The condition (29) defines a shape for the second lens component of the fourth lens unit. If $1/SF_{4N}$ has a large value exceeding the upper limit of the condition (29), positive spherical aberration, positive coma and positive astigmatism will be remarkable in a range from the wide position to the tele position. If $1/SF_{4N}$ has a small value below the lower limit of the condition (29), in contrast, it will undesirably be difficult to correct negative spherical aberration.

Now, description will be made of third and fourth embodiments of the zoom lens system according to the present invention which has the second composition.

The third embodiment has the following numerical data:

third embodiment

| $f = 9.222 \sim 25.465 \sim 71.452, F = 2.0,$ $2\omega = 49.54° \sim 18.29° \sim 6.44°$ | | | |
|---|---|---|---|
| $r_1 = 74.2473$ | | | |
| $d_1 = 2.0000$ | | $n_1 = 1.81264$ | $\nu_1 = 25.43$ |
| $r_2 = 45.4905$ | | | |
| $d_2 = 7.2894$ | | $n_2 = 1.57098$ | $\nu_2 = 71.30$ |
| $r_3 = -2463.4144$ | | | |
| $d_3 = 0.1000$ | | | |
| $r_4 = 36.7241$ | | | |
| $d_4 = 5.1376$ | | $n_3 = 1.57098$ | $\nu_3 = 71.30$ |
| $r_4 = 86.3143$ | | | |
| $d_5 = D_1$ (variable) | | | |
| $r_6 = 104.0007$ | | | |
| $d_6 = 1.2000$ | | $n_4 = 1.62033$ | $\nu_4 = 63.38$ |
| $r_7 = 10.2555$ | | | |
| $d_7 = 5.4554$ | | | |
| $r_8 = -23.9557$ | | | |
| $d_8 = 1.2000$ | | $n_5 = 1.58566$ | $\nu_5 = 46.33$ |
| $r_9 = 37.1970$ | | | |
| $d_9 = 0.1500$ | | | |
| $r_{10} = 21.9251$ | | | |
| $d_{10} = 4.4365$ | | $n_6 = 1.84281$ | $\nu_6 = 21.00$ |
| $r_{11} = 98.0712$ | | | |
| $d_{11} = D_2$ (variable) | | | |
| $r_{12} = \infty$ (stop) | | | |
| $d_{12} = 1.0000$ | | | |
| $r_{13} = 41.5756$ | | | |
| $d_{13} = 10.0004$ | | $n_7 = 1.45720$ | $\nu_7 = 90.31$ |
| $r_{14} = -14.4110$ | | | |
| $d_{14} = 1.4264$ | | | |
| $r_{15} = -12.5427$ | | | |
| $d_{15} = 1.5000$ | | $n_8 = 1.68948$ | $\nu_8 = 44.00$ |
| $r_{16} = -76.0016$ | | | |
| $d_{16} = 1.1979$ | | | |
| $r_{17} = 30.6349$ | | | |
| $d_{17} = 8.0033$ | | $n_9 = 1.49845$ | $\nu_9 = 81.61$ |
| $r_{18} = -37.3930$ | | | |
| $d_{18} = D_3$ (variable) | | | |
| $r_{19} = 39.4855$ | | | |
| $d_{19} = 5.5018$ | | $n_{10} = 1.57098$ | $\nu_{10} = 71.30$ |
| $r_{20} = -30.4322$ | | | |

-continued

| $f = 9.222 \sim 25.465 \sim 71.452, F = 2.0,$ $2\omega = 49.54° \sim 18.29° \sim 6.44°$ | | | |
|---|---|---|---|
| $d_{20} = 5.9407$ | | | |
| $r_{21} = -15.2300$ | | | |
| $d_{21} = 1.2000$ | | $n_{11} = 1.68301$ | $\nu_{11} = 28.52$ |
| $r_{22} = -28.1317$ | | | |
| $d_{22} = 0.9736$ | | | |
| $r_{23} = 24.3513$ | | | |
| $d_{23} = 5.8476$ | | $n_{12} = 1.57098$ | $\nu_{12} = 71.30$ |
| $r_{24} = 42.3088$ | | | |
| $d_{24} = 2.0000$ | | | |
| $r_{25} = \infty$ | | | |
| $d_{25} = 5.0000$ | | $n_{13} = 1.51825$ | $\nu_{13} = 64.15$ |
| $r_{26} = \infty$ | | | |
| f | 9.2220 | 25.4651 | 71.4521 |
| $D_1$ | 1.5000 | 23.1074 | 37.6773 |
| $D_2$ | 37.6773 | 16.0684 | 1.5000 |
| $D_3$ | 5.2629 | 1.7680 | 5.0442 |

$f_W/f_2 = -0.621$, $f_W/f_{3N} = -0.419$, $f_{3P1}/f_{3P2} = 0.705$,
$f_W/f_{4N} = -0.183$, $f_{4P1}/f_{P2} = 0.345$, $1/SF_{1N} = 0.240$,
$1/SF_{2N} = 0.821$, $1/SF_{2P} = -0.635$, $1/SF_{4N} = -0.298$

The third embodiment has a composition illustrated in FIG. 3, wherein the zoom lens system is composed, in order from the object side, of a first lens unit $G_1$ having a positive refractive power, a second lens unit $G_2$ which has a negative refractive power and is moved during zooming monotonously along an optical axis for sharing a vari-focal function, a third lens unit $G_3$ having a positive refractive power, and a fourth lens unit $G_4$ which has a positive refractive power and is moved during zooming in both directions along the optical axis for correcting a location of an image surface. The first lens unit $G_1$ is composed, in order from the object side, of a negative meniscus lens element having a convex surface on the object side and two positive lens elements having higher curvature on object side surfaces thereof, whereas the second lens unit $G_2$ is composed, in order from the object side, of a negative lens element having higher curvature on an image side surface thereof, a negative lens element and a positive lens element having higher curvature on an object side surface thereof. The second lens unit maintains a refractive power satisfying the above-mentioned condition (21).

Each of the third lens unit $G_3$ and the fourth lens unit $G_4$ is composed, in order from the object side, of a first positive lens component $G_{31}$ ($G_{41}$), a second negative lens component $G_{32}$ ($G_{42}$) and a third positive lens component $G_{33}$ ($G_{43}$), and has a function to image a diverging light bundle emerging from the second lens unit. For reserving a required back focal length, the fourth lens unit has a refractive power stronger than that of the third lens unit. For obtaining high optical performance and reserving the required back focal length, the first and third positive lens components, and the second negative lens component are configured so as to satisfy the conditions (22) and (23), whereas the first and third positive lens components, and the second negative lens component of the fourth lens unit are configured so as to satisfy the conditions (24) and (25).

Further, the negative lens element disposed on the object side in the first lens unit satisfies the condition (26).

Furthermore, the negative lens element disposed on the object side and the positive lens element disposed on the image side in the second lens unit satisfy the condition (27) and the condition (28) respectively.

The second negative lens component disposed in the fourth lens unit satisfies the condition (29).

The fourth embodiment of the zoom lens system according to the present invention which has the second composition has numerical data which is listed below:

fourth embodiment

---

$f = 9.211 \sim 25.386 \sim 71.921, F = 2.0,$
$2\omega = 49.82° \sim 17.86° \sim 6.25°$

---

| | | |
|---|---|---|
| $r_1 = 74.3743$ | | |
| $d_1 = 2.0000$ | $n_1 = 1.81264$ | $v_1 = 25.43$ |
| $r_2 = 45.0025$ | | |
| $d_2 = 7.4886$ | $n_2 = 1.59446$ | $v_2 = 68.30$ |
| $r_3 = -340.0089$ | | |
| $d_3 = 0.1000$ | | |
| $r_4 = 40.8856$ | | |
| $d_4 = 4.8883$ | $n_3 = 1.49845$ | $v_3 = 81.61$ |
| $r_5 = 120.1895$ | | |
| $d_5 = D_1$ (variable) | | |
| $r_6 = 286.5521$ | | |
| $d_6 = 1.2000$ | $n_4 = 1.57098$ | $v_4 = 71.30$ |
| $r_7 = 13.0951$ | | |
| $d_7 = 5.6711$ | | |
| $r_8 = -20.6424$ | | |
| $d_8 = 1.2000$ | $n_5 = 1.53316$ | $v_5 = 62.44$ |
| $r_9 = 31.3233$ | | |
| $d_9 = 0.1500$ | | |
| $r_{10} = 24.2330$ | | |
| $d_{10} = 2.4986$ | $n_6 = 1.84281$ | $v_6 = 21.00$ |
| $r_{11} = 61.6418$ | | |
| $d_{11} = D_2$ (variable) | | |
| $r_{12} = \infty$ (stop) | | |
| $d_{12} = 1.0000$ | | |
| $r_{13} = 29.3495$ | | |
| $d_{13} = 10.2289$ | $n_7 = 1.85649$ | $v_7 = 32.28$ |
| $r_{14} = -73.8500$ | | |
| $d_{14} = 3.4469$ | | |
| $r_{15} = -13.7871$ | | |
| $d_{15} = 1.5000$ | $n_8 = 1.73429$ | $v_8 = 28.46$ |
| $r_{16} = 45.4840$ | | |
| $d_{16} = 0.3934$ | | |
| $r_{17} = 36.3656$ | | |
| $d_{17} = 5.1622$ | $n_9 = 1.45720$ | $v_9 = 90.31$ |
| $r_{18} = -13.0126$ | | |
| $d_{18} = D_3$ (variable) | | |
| $r_{19} = 95.1415$ | | |
| $d_{19} = 2.5000$ | $n_{10} = 1.79025$ | $v_{10} = 50.00$ |
| $r_{20} = -45.4224$ | | |
| $d_{20} = 1.7826$ | | |
| $r_{21} = -17.8303$ | | |
| $d_{21} = 1.5000$ | $n_{11} = 1.84281$ | $v_{11} = 21.00$ |
| $r_{22} = -23.3514$ | | |
| $d_{22} = 0.1500$ | | |
| $r_{23} = 28.7447$ | | |
| $d_{23} = 12.5002$ | $n_{12} = 1.74435$ | $v_{12} = 52.68$ |
| $r_{24} = 155.6295$ | | |
| $d_{24} = 2.0000$ | | |
| $r_{25} = \infty$ | | |
| $d_{25} = 5.0000$ | $n_{13} = 1.51825$ | $v_{13} = 64.15$ |
| $r_{26} = \infty$ | | |

| f | 9.2105 | 25.3861 | 71.9205 |
|---|---|---|---|
| $D_1$ | 1.5000 | 21.7937 | 35.3710 |
| $D_2$ | 35.2710 | 14.9705 | 1.5000 |
| $D_3$ | 5.4748 | 2.8561 | 7.0388 |
| $D_3'$ | 5.3885 | 2.2668 | 2.7842 |

$f_W/f_2 = -0.633, f_W/f_{3N} = -0.646, f_{3P1}/f_{3P2} = 1.186,$
$f_W/f_{4N} = -0.090, f_{4P1}/f_{4P2} = 0.863, 1/SF_{1N} = 0.246,$
$1/SF_{2N} = 0.913, 1/SF_{2P} = -0.436, 1/SF_{4N} = -0.134$
$d/f_W = 1.357$

---

The fourth embodiment has a composition which is similar to that of the third embodiment and is configured to be focused by moving the fourth lens unit toward the object side. Accordingly, an airspace is reserved between the third lens unit $G_3$ and the fourth lens unit $G_4$, the difficulty to reserve the required back focal length is compensated by weakening the refractive power of the third lens unit and strengthening the refractive power of the fourth lens unit.

When a lens unit which has a function to correct a deviation of an image surface is moved for focusing a zoom lens system such as that according to the present invention, it is important to correct astigmatism in the focusing lens unit, or the fourth lens unit in the zoom lens system according to the present invention. For this purpose, it is desirable that the lens unit to be moved for focusing comprises at least one lens element which satisfies the following condition (30):

$$0.7 < d/f_W < 2.0 \qquad (30)$$

wherein the reference symbol d represents thickness of a central portion of the lens element mentioned above.

If $d/f_W$ of all lens elements disposed in the focusing lens unit has a small value exceeding the lower limit of the condition (30), it will be difficult to sufficiently correct astigmatism and the image surface will undesirably be varied remarkably by zooming or focusing due to remaining astigmatism. If a lens element which has $d/f_W$ exceeding the upper limit of the condition (30) is to be disposed in the focusing lens unit, it will be difficult to manufacture such a lens element in practice and the movable lens unit will undesirably be heavy, thereby requiring a strong driving force. In the fourth embodiment, the positive lens element disposed on the image side in the fourth lens unit satisfies the condition (30).

For suppressing production of astigmatism, it is desirable to satisfy the following condition (30-1) in place of the condition (30):

$$1.0 < d/f_W < 2.0 \qquad (30-1)$$

The fourth embodiment which satisfies the conditions mentioned above also maintains the high optical performance and small variations of aberrations caused by focusing. A variation of the airspace caused by moving the fourth lens unit for focusing is represented by the reference symbol $D_3'$ in the numerical data.

In each of the third embodiment and the fourth embodiment, the planar glass plate disposed on the image side of the zoom lens system represents a glass plate for protecting an image pickup surface of a solid-state image pickup device, and a low pass filter for preventing moiré on an image picked up by the image pickup device, an infrared cut-filter and so on.

It is apparent that the present invention is effective not only for the focusing mode selected for each of the third and fourth embodiments in which the fourth lens unit is moved but also another focusing mode which uses the third lens unit, a lens component or lens components disposed in the third and/or fourth lens unit.

Figure 5:
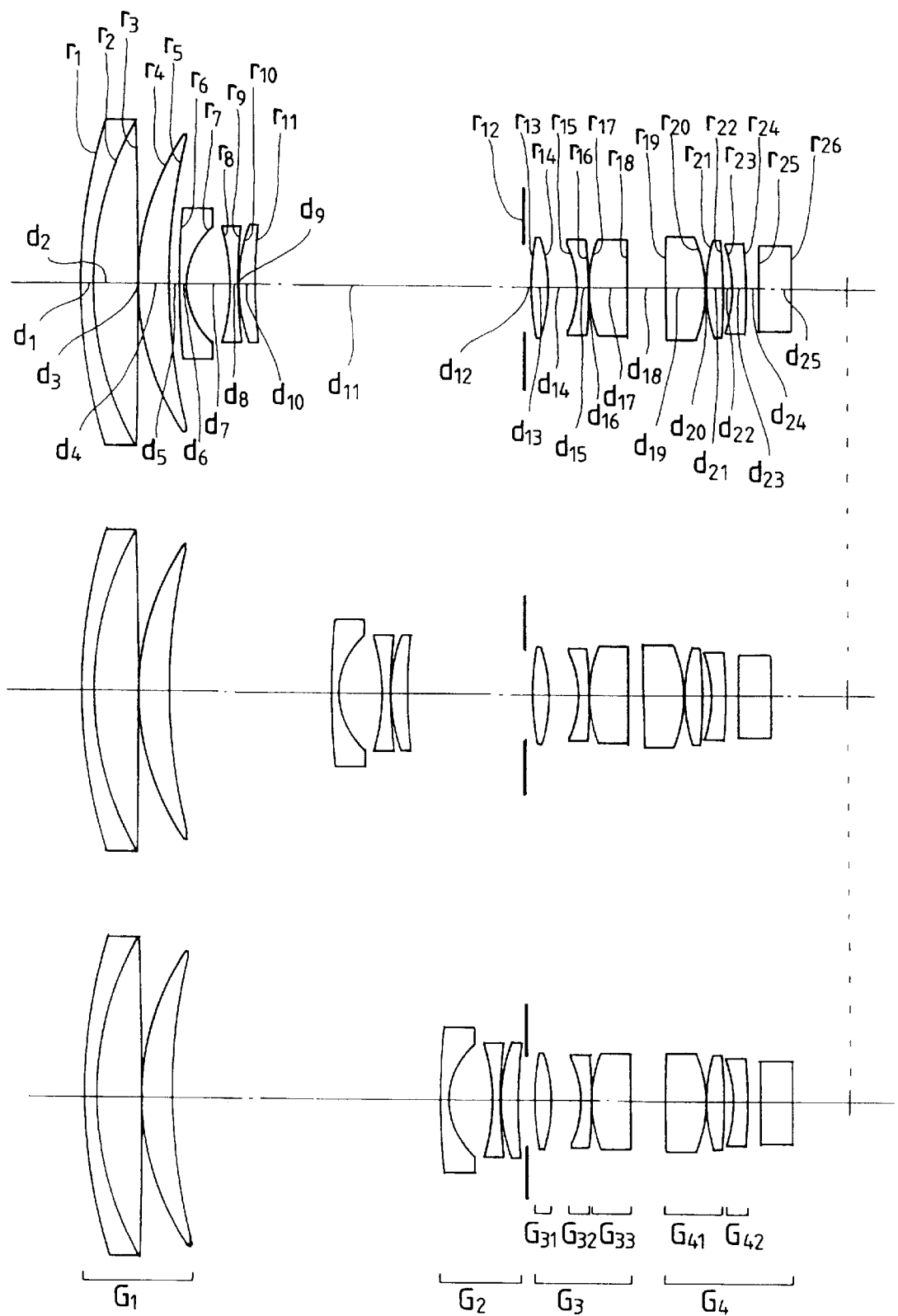

The zoom lens system according to the present invention which has the third composition has a composition illustrated in FIG. 5, wherein the zoom lens system is composed, in order from the object side, of a first lens unit $G_1$ having a positive power, a second lens unit $G_2$ which has a negative power and is moved during zooming monotonously along an optical axis for sharing a main vari-focal function, a third lens unit $G_3$ having a positive refractive power, and a fourth lens unit $G_4$ which is moved during zooming in both directions for correcting a deviation of an image surface caused by changing a magnification; and configured to be focused by moving the third lens unit, the fourth lens unit, a lens component or lens components disposed therein: the third lens unit $G_3$ being composed, in order from the object side, of a first positive lens component $G_{31}$ which comprises at least one positive lens element, a second negative lens component $G_{32}$ which comprises at least one negative lens element and a third positive lens component $G_{33}$ which comprises at least one positive lens element, whereas the fourth lens unit $G_4$ being composed, in order from the object side, of a first positive lens component $G_{41}$ which comprises at least one positive lens element and a second negative lens component $G_{42}$ which comprises at least one negative lens element. This zoom lens system is characterized in that it satisfies the following conditions:

$$-0.67 < f_W/f_2 < -0.50 \tag{31}$$

$$-0.67 < f_W/f_{3N} < -0.35 \tag{32}$$

$$0.50 < f_{3P1}/f_{3P2} < 2.00 \tag{33}$$

$$-0.40 < f_W/f_{4N} < -0.10 \tag{34}$$

The condition (31) through the condition (34) which are mentioned above will be described. If $f_W/f_2$ has a large value exceeding the upper limit of the condition (31), the negative refractive power of the second lens unit will be insufficient, thereby making it difficult to configure the zoom lens compactly and reserve a required back focal length even by contriving compositions of the other lens units. If $f_W/f_2$ has a small value below the lower limit of the condition (31), in contrast, it will be advantageous for configuring the zoom lens compactly and reserve the required back focal length, but the positive refractive power of the third lens unit or the fourth lens unit must be strengthened, thereby making it impossible to maintain high optical performance due to aggravation of aberrations.

The third lens unit is composed, in order from the object side, of the first positive lens component, the second negative lens component and the third positive lens component, and the fourth lens unit is composed, in order from the object side, of the first positive lens component and the second negative lens component as described above. Out of the third lens unit and the fourth lens unit which have a function to image a diverging light bundle emerging from the second lens unit, the fourth lens unit has a refractive power stronger than that of the third lens unit for reserving the required back focal length. For obtaining high optical performance and reserving the required back focal length, the first and third positive lens components, and the second negative lens component of the third lens unit are configured so as to satisfy the conditions (32) and (33), and the second negative lens component of the fourth lens unit is configured so as to satisfy the condition (34).

The condition (32) defines a refractive power for the second negative lens component of the third lens unit. If $f_W/f_{3N}$ has a small value below the lower limit of the condition (32), spherical aberration, remarkable positive spherical aberration at the tele position in particular, will be produced and it will be difficult to correct coma. If $f_W/f_{3N}$ has a large value exceeding the upper limit of the condition (32), it will be difficult to correct negative spherical aberration and astigmatism produced by the first and third positive lens component with the second negative lens component. The condition (33) defines refractive power distribution between the first and third positive lens components of the third lens unit. If $f_{3P1}/f_{3P2}$ has a small value below the lower limit of the condition (33), it will be difficult to reserve the required back focal length, and in addition, spherical aberration as well as astigmatism will be product remarkably. If $f_{3P1}/f_{3P2}$ has a large value exceeding the upper limit of the condition (33), it will undesirably difficult to correct coma and spherical aberration.

The condition (34) defines a refractive power for the second negative lens component of the fourth lens unit. If $f_W/f_{4N}$ has a small value below the lower limit of the condition (34), positive spherical aberration, coma and astigmatism will be remarkable in the range from the wide position to the tele position, and can hardly be corrected with the other lens units. If $f_W/f_{4N}$ has a large value exceeding the upper limit of the condition (34), in contrast, it will be difficult to correct negative spherical aberration, negative coma and astigmatism produced by the first and third positive lens components with the second negative lens component.

For maintaining higher optical performance of the zoom lens system according to the present invention, it is desirable to satisfy condition (31-1) mentioned below in place of the condition (31), condition (32-1) mentioned below in place of the condition (32), condition (33-1) mentioned below in place of the condition (33) or condition (34-1) mentioned below in place of the condition (34):

$$-0.64 < f_W/f_2 < -0.54 \tag{31-1}$$

$$-0.58 < f_W/f_{3N} < -0.37 \tag{32-1}$$

$$0.55 < f_{3P1}/f_{3P2} < 1.60 \tag{33-1}$$

$$-0.33 < f_W/f_{4N} < -0.10 \tag{34-1}$$

Further, it is desirable that the negative meniscus lens element disposed on the object side in the first lens unit satisfies the following condition (35):

$$0.00 < 1/SF_{1N} < 0.45 \tag{35}$$

wherein the reference symbol $SF_{1N}$ represents a shaping factor for the negative meniscus lens element disposed on the object side in the first lens unit.

The condition (35) defines a shape for the negative lens element disposed on the object side in the first lens unit. If $1/SF_{1N}$ has a large value exceeding the upper limit of the condition (35), positive astigmatism and negative distortion will be remarkable at the wide position, and positive spherical aberration and positive astigmatism will be aggravated at the tele position. If $1/SF_{1N}$ has a small value below the lower limit of the condition (35), negative spherical aberration will undesirably be aggravated at the tele position.

For obtaining higher optical performance of the zoom lens system, it is desirable to satisfy the following condition (35-1) in place of the condition (35):

$$0.10 < 1/SF_{1N} < 0.35 \tag{35-1}$$

Further, it is desirable that the negative lens element disposed on the object side in the second lens unit satisfies the following condition (36) and that the positive lens element disposed on the image side in the second lens unit satisfies the following condition (37):

$$0.6 < 1/SF_{2N} < 2.0 \tag{36}$$

$$-2.0 < 1/SF_{2P} < -0.3 \tag{37}$$

wherein the reference symbol $SF_{2N}$ represents a shaping factor for the negative lens element disposed on the object side and the reference symbol $SF_{2P}$ designates a shaping factor for the positive lens element disposed on the image side.

The condition (36) defines a shape for the negative lens element disposed on the object side in the second lens unit. If $1/SF_{2N}$ has a large value exceeding the upper limit of the condition (36), negative distortion and positive astigmatism will be remarkable at the wide position, and it will be difficult to correct spherical aberration, positive astigmatism and negative coma at the tele position. If $1/SF_{2N}$ has a small value below the lower limit of the condition (36), positive astigmatism and negative coma at the wide position as well as positive spherical aberration at the tele position will undesirably be aggravated. The condition (37) defines a shape for the positive lens element disposed on the image side in the second lens unit. If $1/SF_{2P}$ has a large value exceeding the upper limit of the condition (37), negative astigmatism will be remarkable at the wide position and it will be difficult to correct negative spherical aberration at the tele position. If $1/SF_{2P}$ has a small value below the lower limit of the condition (37), positive astigmatism at the wide position and positive spherical aberration at the tele position will undesirably be aggravated.

For maintaining optical performance of the zoom lens system according to the present invention which has the second composition, it is desirable to satisfy condition (36-1) mentioned below in place of the condition (36) or condition (37-1) mentioned below in place of the condition (37):

$$0.7 < 1/SF_{2N} < 1.5 \qquad (36\text{-}1)$$

$$-0.7 < 1/SF_{2P} < -0.4 \qquad (37\text{-}1)$$

Further, it is desirable to dispose a negative lens element satisfying the condition (38) mentioned below in the second negative lens component of the fourth lens unit:

$$-1.5 < 1/SF_{4N} < -0.2 \qquad (38)$$

wherein the reference symbol $SF_{4N}$ represents a shaping factor for the negative lens element.

The condition (38) defines a shape for the negative lens element. If $1/SF_{4N}$ has a large value exceeding the upper limit of the condition (38), positive astigmatism at the wide position as well as positive spherical aberration, positive coma and positive astigmatism at the tele position will be remarkable. If $1/SF_{4N}$ has a small value below the lower limit of the condition (38), in contrast, it will undesirably be difficult to correct negative spherical aberration, negative astigmatism and coma.

For maintaining higher optical performance of the zoom lens system according to the present invention which has the third composition, it is desirable to satisfy the following condition (38-1) in place of the condition (38):

$$-1.0 < 1/SF_{4N} < -0.25 \qquad (38\text{-}1)$$

Now, description will be made of a fifth embodiment and a sixth embodiment of the zoom lens system according to the present invention which has the third composition.

The fifth embodiment has numerical data which is listed below:

fifth embodiment $f = 9.184 \sim 24.470 \sim 71.664, F = 2.0,$
$2\omega = 49.76° \sim 18.20° \sim 6.37°$

| | | |
|---|---|---|
| $r_1 = 76.0219$ | | |
| $d_1 = 2.0000$ | $n_1 = 1.81264$ | $v_1 = 25.43$ |
| $r_2 = 46.9449$ | | |
| $d_2 = 6.4925$ | $n_2 = 1.57098$ | $v_2 = 71.30$ |
| $r_3 = 6147.6174$ | | |
| $d_3 = 0.1000$ | | |
| $r_4 = 38.1539$ | | |
| $d_4 = 4.6362$ | $n_3 = 1.57098$ | $v_3 = 71.30$ |
| $r_5 = 89.2921$ | | |

-continued $f = 9.184 \sim 24.470 \sim 71.664, F = 2.0,$
$2\omega = 49.76° \sim 18.20° \sim 6.37°$

| | | |
|---|---|---|
| $d_5 = D_1$ (variable) | | |
| $r_6 = 122.7242$ | | |
| $d_6 = 1.2000$ | $n_4 = 1.60548$ | $v_4 = 60.70$ |
| $r_7 = 11.1739$ | | |
| $d_7 = 6.4347$ | | |
| $r_8 = -25.8509$ | | |
| $d_8 = 1.2000$ | $n_5 = 1.60548$ | $v_5 = 60.70$ |
| $r_9 = 60.8049$ | | |
| $d_9 = 0.1500$ | | |
| $r_{10} = 25.0389$ | | |
| $d_{10} = 2.5005$ | $n_6 = 1.84281$ | $v_6 = 21.00$ |
| $r_{11} = 73.3906$ | | |
| $d_{11} = D_2$ (variable) | | |
| $r_{12} = \infty$ (stop) | | |
| $d_{12} = 1.0000$ | | |
| $r_{13} = 41.5393$ | | |
| $d_{13} = 2.5000$ | $n_7 = 1.60520$ | $v_7 = 65.48$ |
| $r_{14} = -23.1523$ | | |
| $d_{14} = 4.3883$ | | |
| $r_{15} = -14.2694$ | | |
| $d_{15} = 1.5000$ | $n_8 = 1.67158$ | $v_8 = 33.04$ |
| $r_{16} = -272.4060$ | | |
| $d_{16} = 0.1500$ | | |
| $r_{17} = 21.9464$ | | |
| $d_{17} = 5.7191$ | $n_9 = 1.60520$ | $v_9 = 65.48$ |
| $r_{18} = 16340.0003$ | | |
| $d_{18} = D_3$ (variable) | | |
| $r_{19} = 264.4363$ | | |
| $d_{19} = 5.9598$ | $n_{10} = 1.60520$ | $v_{10} = 65.48$ |
| $r_{20} = -20.9687$ | | |
| $d_{20} = 0.1904$ | | |
| $r_{21} = 25.7396$ | | |
| $d_{21} = 2.5000$ | $n_{11} = 1.60520$ | $v_{11} = 65.48$ |
| $r_{22} = -76.4829$ | | |
| $d_{22} = 1.4358$ | | |
| $r_{23} = -17.3352$ | | |
| $d_{23} = 2.0000$ | $n_{12} = 1.67158$ | $v_{12} = 33.04$ |
| $r_{24} = -98.2036$ | | |
| $d_{24} = 2.0000$ | | |
| $r_{25} = \infty$ | | |
| $d_{25} = 5.0000$ | $n_{13} = 1.51825$ | $v_{13} = 64.15$ |
| $r_{26} = \infty$ | | |

| f | 9.1839 | 25.4699 | 71.6636 |
|---|---|---|---|
| $D_1$ | 1.5000 | 24.3140 | 40.2665 |
| $D_2$ | 40.2665 | 17.4506 | 1.5000 |
| $D_3$ | 5.6148 | 2.2756 | 5.1709 |

$f_W/f_2 = -0.583, f_W/f_{3N} = -0.409, f_{3P1}/f_{3P2} = 0.687,$
$f_W/f_{4N} = -0.290, 1/SF_{1N} = 0.237, 1/SF_{2N} = 0.833,$
$1/SF_{2P} = -0.491, 1/SF_{4N} = -0.700$

As illustrated in FIG. 5, the fifth embodiment is composed, in order from the object side, of a first lens unit $G_1$ having a positive refractive power, a second lens unit $G_2$ which has a negative refractive power and is moved during zooming monotonously along an optical axis for sharing a vari-focal function, a third lens unit $G_3$ having a positive refractive power, and a fourth lens unit $G_4$ which has a positive refractive power and is moved during zooming in both directions along the optical axis for correcting a location of an image surface. The first lens unit is composed, in order from the object side, of a negative meniscus lens element having a convex surface on the object side, two positive lens elements having higher curvature on object side surfaces thereof, and the second lens unit is composed, in order from the object side, of a negative lens element having higher curvature on an image side surface thereof, a negative lens element and a positive lens element having higher curvature on an object side surface thereof. The second lens unit maintains a refractive power satisfying the condition (31).

The third lens unit $G_3$ is composed, in order from the object side, of a first positive lens component $G_{31}$, a second negative lens component $G_{32}$ and a third positive lens component $G_{33}$, whereas the fourth lens unit is composed, in order from the object side, of a first lens component $G_{41}$ consisting of two positive lens elements and a second negative lens component $G_{42}$. Out of the third lens unit and the fourth lens unit which have a function to image a diverging light bundle coming from the second lens unit, the fourth lens unit has a refractive power stronger than that of the third lens unit. For maintaining high optical performance and reserving the required back focal length, the first and third positive lens components of the third lens unit are configured so as to satisfy the conditions (32) and (33), whereas the second negative lens component of the fourth lens unit is configured so as to satisfy the condition (34).

The negative lens element disposed on the image side in the first lens unit of the fifth embodiment satisfies the condition (35), whereas the negative lens element disposed on the object side in the second lens unit satisfies the condition (36) and the positive lens element disposed on the image side satisfies the condition (37). Further, the second negative lens component of the fourth lens unit satisfies the condition (38).

The sixth embodiment of the present invention has the following numerical data:

sixth embodiment $f = 9.114 \sim 25.428 \sim 71.949, F = 2.0,$
$2\omega = 49.72° \sim 17.83° \sim 6.26°$

| | | |
|---|---|---|
| $r_1 = 85.9670$ | | |
| $d_1 = 2.0000$ | $n_1 = 1.81264$ | $v_1 = 25.43$ |
| $r_2 = 48.7508$ | | |
| $d_2 = 7.1493$ | $n_2 = 1.57098$ | $v_2 = 71.30$ |
| $r_3 = -499.7847$ | | |
| $d_3 = 0.1000$ | | |
| $r_4 = 43.3093$ | | |
| $d_4 = 4.9822$ | $n_3 = 1.59446$ | $v_3 = 68.30$ |
| $r_5 = 149.3725$ | | |
| $d_5 = D_1$ (variable) | | |
| $r_6 = 417.8876$ | | |
| $d = 1.2000$ | $n_4 = 1.73234$ | $v_4 = 54.68$ |
| $r_7 = 13.0492$ | | |
| $d_7 = 5.1370$ | | |
| $r_8 = -24.5041$ | | |
| $d_8 = 1.2000$ | $n_5 = 1.50558$ | $v_5 = 62.81$ |
| $r_9 = 52.8681$ | | |
| $d_9 = 0.1500$ | | |
| $r_{10} = 25.8541$ | | |
| $d_{10} = 4.3158$ | $n_6 = 1.84281$ | $v_6 = 21.00$ |
| $r_{11} = 80.7541$ | | |
| $d_{11} = D_2$ (variable) | | |
| $r_{12} = \infty$ (stop) | | |
| $d_{12} = 1.0000$ | | |
| $r_{13} = 46.3648$ | | |
| $d_{13} = 10.3139$ | $n_7 = 1.82017$ | $v_7 = 46.62$ |
| $r_{14} = -80.7457$ | | |
| $d_{14} = 6.6521$ | | |
| $r_{15} = -13.5421$ | | |
| $d_{15} = 1.5000$ | $n_8 = 1.59667$ | $v_8 = 35.29$ |
| $r_{16} = 60.8714$ | | |
| $d_{16} = 0.1500$ | | |
| $r_{17} = 31.8959$ | | |
| $d_{17} = 8.0330$ | $n_9 = 1.49845$ | $v_9 = 81.61$ |
| $r_{18} = -18.0958$ | | |
| $d_{18} = D_3$ (variable) | | |
| $r_{19} = 75.8589$ | | |
| $d_{19} = 2.5000$ | $n_{10} = 1.57098$ | $v_{10} = 71.30$ |
| $r_{20} = -47.3959$ | | |
| $d_{20} = 0.1500$ | | |
| $r_{21} = 32.7892$ | | |
| $d_{21} = 2.5000$ | $n_{11} = 1.57098$ | $v_{11} = 71.30$ |
| $r_{22} = -65.0876$ | | |
| $d_{22} = 1.4258$ | | |
| $r_{23} = -23.7784$ | | |

-continued $f = 9.114 \sim 25.428 \sim 71.949, F = 2.0,$
$2\omega = 49.72° \sim 17.83° \sim 6.26°$

| | | |
|---|---|---|
| $d_{23} = 1.5000$ | $n_{12} = 1.65258$ | $v_{12} = 31.23$ |
| $r_{24} = -47.6853$ | | |
| $d_{24} = 2.0000$ | | |
| $r_{25} = \infty$ | | |
| $d_{25} = 5.0000$ | $n_{13} = 1.51825$ | $v_{13} = 64.15$ |
| $r_{26} = \infty$ | | |

| | | | |
|---|---|---|---|
| f | 9.1141 | 25.4275 | 71.9494 |
| $D_1$ | 1.5000 | 23.6392 | 37.8580 |
| $D_2$ | 37.8580 | 15.7186 | 1.5000 |
| $D_3$ | 4.3600 | 1.6631 | 5.7098 |
| $D_3'$ | 4.2768 | 1.0759 | 1.5386 |

$f_W/f_2 = -0.589, f_W/f_{3N} = -0.495, f_{3P1}/f_{3P2} = 1.523,$
$f_W/f_{4N} = -0.122, 1/SF_{1N} = 0.276, 1/SF_{2N} = 0.939,$
$1/SF_{2P} = -0.515, 1/SF_{4N} = -0.335$

The sixth embodiment has a composition which is similar to that of the fifth embodiment and is configured to be focused by moving the fourth lens unit. Further, the sixth embodiment which selects weakened refractive powers for the third lens unit and the fourth lens unit has a back focal length longer than that of a fifth embodiment.

The sixth embodiment which satisfies the conditions (31) through (34) also maintains high optical performance and allows aberrations to be varied scarcely by focusing. The reference symbol $D_3'$ used in the numerical data represents an airspace which is reserved between the third lens unit and the fourth lens unit in a condition where the zoom lens system is focused on an object located at a distance of 1 m by moving the fourth lens unit.

A planar glass plate disposed on the image side of the zoom lens system in each of the fifth and sixth embodiments represents a glass plate for protecting an image pickup surface of a solid-state image pickup device, a low pass filter for preventing moiré on an image picked up by an electronic image pickup device, an infrared cut filter and so on.

It is apparent that the present invention is effective not only for the focusing mode using the fourth lens unit which is adopted for the fifth and sixth embodiment; but also another focusing mode which uses the third lens unit, a lens component or lens components disposed in the fourth lens unit.

Figure 7:
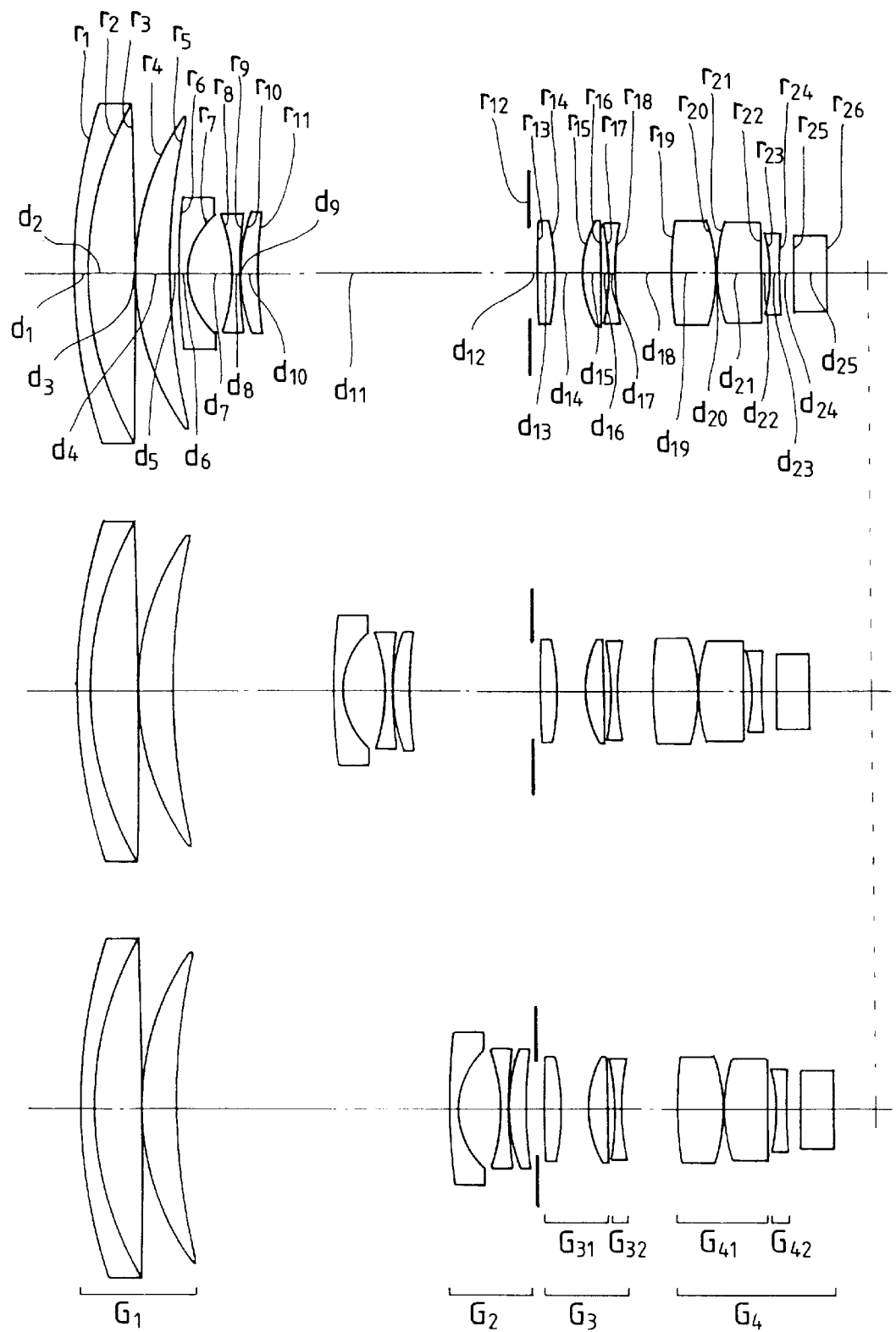
Figure 8:
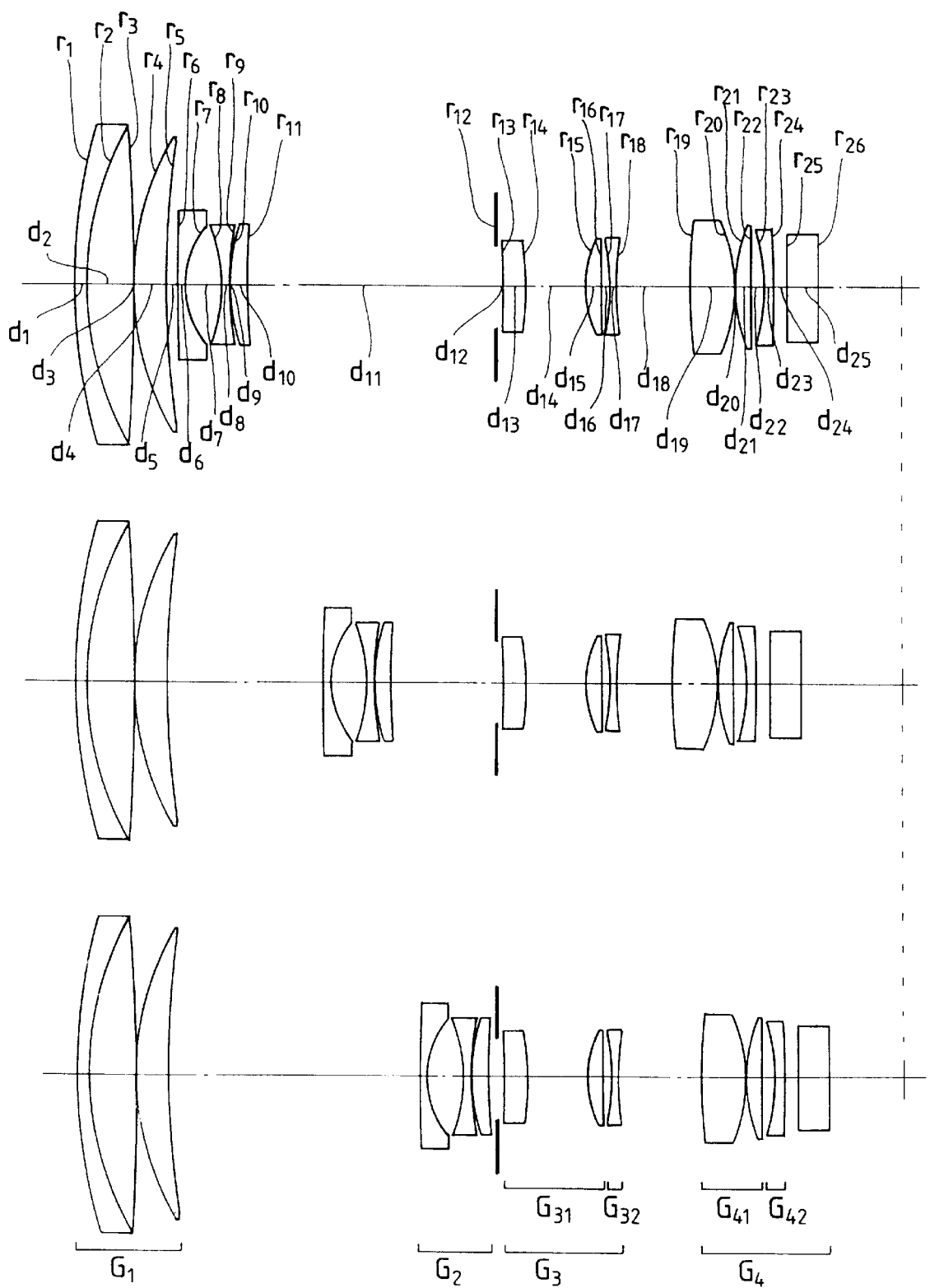

The zoom lens system according to the present invention which has the fourth composition is illustrated in FIG. 7 and FIG. 8, wherein a zoom lens system is composed, in order from the object side, of a first lens units $G_1$ having a positive power, a second lens unit $G_2$ which has a negative power and is moved during zooming monotonously along an optical axis for sharing a main vari-focal function, a third lens unit $G_3$ having a positive power, and a fourth lens unit $G_4$ which has a positive power and is moved during zooming in both directions for correcting a deviation of an image surface caused by changing a magnification; and configured to be focused by moving the third lens unit, the fourth lens unit, a lens component or lens components disposed therein: the third lens unit being composed, in order from the object side, of a first positive lens component $G_{31}$ which comprises at least one positive lens element and a second negative lens component $G_{32}$ which comprises at least one negative lens element, whereas the fourth lens unit being composed, in order from the object side, of a first positive lens component $G_{41}$ which comprises at least one positive lens element and a second negative lens component $G_{42}$ which comprises at least one negative lens element. This zoom lens system is characterized in that it satisfies the conditions listed below:

$$-0.65 < f_W/f_2 < -0.50 \tag{41}$$

$$+0.02 < f_{3P}/f_3 < 0.40 \tag{42}$$

$$-0.60 < f_{3N}/f_3 < -0.10 \tag{43}$$

Now, significance of the conditions mentioned above will be described below. The condition (41) defines a refractive power for the second lens unit. The second lens unit maintains a refractive power so as to satisfy the condition (41). If $f_W/f_2$ has a large value exceeding the upper limit of the condition (41), the negative refractive power of the second lens unit will be insufficient, thereby making it difficult to configure the zoom lens system compactly and reserve the required back focal length even by contriving compositions of the other lens units. If $f_W/f_2$ has a small value below the lower limit of he condition (41), in contrast, it will be advantageous for configuring the zoom lens system compactly and reserving the required back focal length, but the refractive power of the third lens unit or the fourth lens unit must also be strengthened, thereby aggravating aberrations and making it impossible to maintain the high optical performance.

Each of the third lens unit and the fourth lens unit is composed, in order from the object side, of the first positive lens component and the second negative lens component, and has the function to image the diverging light bundle emerging from the second lens unit. For reserving the required back focal length, the refractive power of the fourth lens unit is stronger than that of the third lens unit. The first positive lens component and the second negative lens component of the third lens unit are configured so as to satisfy the conditions (42) and (43). If $f_{3P}/f_3$ has a small value below the lower limit of the condition (42) or $f_{3N}/f_3$ has a large value exceeding the upper limit of the condition (43), the third lens unit will have a strong telephoto type refractive power distribution, thereby making it difficult to reserve the required back focal length and correct spherical aberration aggravated by the first positive lens component. If $f_{3P}/f_3$ has a large value exceeding the upper limit of the condition (42) or $f_{3N}/f_3$ has a small value exceeding the lower limit of the condition (43), it will be advantageous for reserving the required back focal length, but incident rays will be high on the fourth lens unit, thereby allowing a large variation of spherical aberration produced by the fourth lens unit.

For maintaining the high optical performance of the zoom lens system according to the present invention which has the fourth composition, it is desirable to satisfy condition (41-1) mentioned below in place of the condition (41), condition (42-1) mentioned below in place of the condition (42) or condition (43-1) mentioned below in place of the condition (43):

$$-0.60 < f_W/f_2 < -0.55 \tag{41-1}$$

$$0.25 < f_{3P}/f_3 < 0.40 \tag{42-1}$$

$$-0.50 < f_{3N}/f_3 < -0.2 \tag{43-1}$$

Further, it is desirable that the negative lens element disposed on the object side in the first lens unit satisfies the following condition (44):

$$0.1 < 1/SF_{1N} < 0.4 \tag{44}$$

wherein the reference symbol $SP_{1N}$ represents a shaping factor for the negative lens element disposed on the object side in the first lens unit.

The condition (44) defines a shape for the negative lens element. If $1/SF_{1N}$ has a large value exceeding the upper limit of the condition (44), positive astigmatism will be remarkable at the wide position, and positive spherical aberration, negative coma and positive astigmatism will be aggravated at the tele position. If $1/SF_{1N}$ as a small value exceeding the lower limit of the condition (44), negative spherical aberration and negative astigmatism will undesirably be aggravated at the tele position.

For obtaining higher optical performance of the room lens system which has the fourth composition, it is desirable to satisfy the following condition (44-1) in place of the condition (44):

$$0.15 < 1/SF_{1N} < 0.3 \tag{44-1}$$

Furthermore, it is desirable that the negative lens element disposed on the object side in the second lens unit satisfies the following condition (45):

$$0.1 < SF_{21} < 1.6 \tag{45}$$

wherein the reference symbol $SF_{21}$ represents a shaping factor for the negative lens element disposed on the object side in the second lens unit.

The condition (45) defines a shape for the negative lens element mentioned above. If $SF_{21}$ has a large value exceeding the upper limit of the condition (45), positive astigmatism and negative coma will be remarkable at the vice position, and positive spherical aberration and negative astigmatism will be aggravated at the tele position. If $SF_{21}$ has a small value below the lower limit of the condition (45), distortion at the wide position as well as positive spherical aberration and positive astigmatism at the tele position will undesirably be aggravated.

For maintaining further higher optical performance of the zoom lens system which has the fourth composition, it is desirable to satisfy condition (45-1) mentioned below in place of the condition (45):

$$0.4 < SF_{21} < 1.5 \tag{45-1}$$

Moreover, it is desirable that the positive lens element disposed at the second object side location in the fourth lens unit satisfies the condition $$-2.0 < SF_{42} < -0.5 \tag{46}$$

The condition (46) defines a shape for the positive lens clement disposed at the second object side location in the fourth lens unit. If $SF_{42}$ has a large value exceeding the upper limit of the condition (46), negative spherical aberration and negative astigmatism will be remarkable in the range from the wide position to the tele position. If $SF_{42}$ has a small value below the lower limit of the condition (46), positive spherical aberration and positive astigmatism will undesirably be aggravated in the range from the wide position to the tele position.

Now, seventh and eighth embodiments of the zoom lens system according to the present invention which has the fourth composition will be described.

The seventh embodiment has the following numerical data:

seventh embodiment

| f = 9.279 ~ 25.467 ~ 71.873, F = 2.0 |
| 2ω = 49.32° ~ 18.21° ~ 6.37° |

| $r_1$ = 75.5864 | | |
| $d_1$ = 2.0000 | $n_1$ = 1.81264 | $v_1$ = 25.43 |

-continued $f = 9.279 \sim 25.467 \sim 71.873, F = 2.0$
$2\omega = 49.32° \sim 18.21° \sim 6.37°$

| | | |
|---|---|---|
| $r_2 = 46.7543$ | | |
| $d_2 = 6.8730$ | $n_2 = 1.57098$ | $\nu_2 = 71.30$ |
| $r_3 = 4370.8280$ | | |
| $d_3 = 0.1000$ | | |
| $r_4 = 38.3940$ | | |
| $d_4 = 4.9240$ | $n_3 = 1.57098$ | $\nu_3 = 71.30$ |
| $r_5 = 91.3196$ | | |
| $d_5 = D_1$ (variable) | | |
| $r_6 = 102.2782$ | | |
| $d_6 = 1.2000$ | $n_4 = 1.60548$ | $\nu_4 = 60.70$ |
| $r_7 = 11.0306$ | | |
| $d_7 = 6.2361$ | | |
| $r_8 = -25.0051$ | | |
| $d_8 = 1.2000$ | $n_5 = 1.60548$ | $\nu_4 = 60.70$ |
| $r_9 = 66.2220$ | | |
| $d_9 = 0.1500$ | | |
| $r_{10} = 24.7870$ | | |
| $d_{10} = 2.4995$ | $n_6 = 1.84281$ | $\nu_6 = 21.00$ |
| $r_{11} = 69.3809$ | | |
| $d_{11} = D_2$ (variable) | | |
| $r_{12} = \infty$ (stop) | | |
| $d_{12} = 1.0000$ | | |
| $r_{13} = 108.1566$ | | |
| $d_{13} = 2.5000$ | $n_7 = 1.60520$ | $\nu_7 = 65.48$ |
| $r_{14} = -39.0800$ | | |
| $d_{14} = 4.2080$ | | |
| $r_{15} = 16.9122$ | | |
| $d_{15} = 2.4997$ | $n_8 = 1.60520$ | $\nu_8 = 65.48$ |
| $r_{16} = -952.9516$ | | |
| $d_{16} = 1.0964$ | | |
| $r_{17} = -38.4452$ | | |
| $d_{17} = 1.0000$ | $n_9 = 1.85649$ | $\nu_9 = 32.28$ |
| $r_{13} = 37.0738$ | | |
| $d_{18} = D_3$ (variable) | | |
| $r_{19} = 50.7917$ | | |
| $d_{19} = 6.5000$ | $n_{10} = 1.60520$ | $\nu_{10} = 65.48$ |
| $r_{20} = -23.3362$ | | |
| $d_{20} = 0.1493$ | | |
| $r_{21} = 21.3274$ | | |
| $d_{21} = 6.5000$ | $n_{11} = 1.60520$ | $\nu_{11} = 65.48$ |
| $r_{22} = -317.4555$ | | |
| $d_{22} = 1.1700$ | | |
| $r_{23} = -22.2303$ | | |
| $d_{23} = 1.5000$ | $n_{12} = 1.67158$ | $\nu_{12} = 33.04$ |
| $r_{24} = 112.3342$ | | |
| $d_{24} = 2.0000$ | | |
| $r_{25} = \infty$ | | |
| $d_{25} = 5.0000$ | $n_{13} = 1.51825$ | $\nu_{13} = 64.15$ |
| $r_{26} = \infty$ | | |

| f | 9.2790 | 25.4666 | 71.8725 |
|---|---|---|---|
| $D_1$ | 1.5000 | 23.3128 | 39.8492 |
| $D_2$ | 39.8492 | 18.0317 | 1.5000 |
| $D_3$ | 8.1966 | 5.1359 | 8.1493 |

The seventh embodiment has a composition illustrated in FIG. 7, wherein the zoom lens system is composed, in order from the object side, of a first positive lens unit $G_1$ having a positive refractive power, a second lens unit $G_2$ which has a negative refractive power and is moved during zooming monotonously along an optical axis for sharing a vari-focal function, a third lens unit $G_3$ having a positive refractive power, and a fourth lens unit $G_4$ which has a positive refractive power and is moved during zooming in both directions along the optical axis for correcting a location of an image surface. The first lens unit is composed, in order from the object side, of a negative meniscus lens element having a convex surface on the object side and two positive lens elements having higher curvature on object side surfaces thereof, whereas the second lens unit is composed, in order from the object side, of a negative lens element having higher curvature on an image side surface thereof, a negative lens element and a positive lens element. The second lens unit maintains a refractive power so as to satisfy the condition (41).

Each of the third lens unit and the fourth lens unit is composed, in order from the object side, of two positive lens elements and a negative lens element, and has a function to image a diverging light bundle emerging from the second lens unit. The fourth lens unit has a refractive power stronger than that of the third lens unit for reserving the required back focal length. A first positive lens component $G_{31}$ and a second negative lens component $G_{32}$ Of the third lens unit are configured so as to satisfy the conditions (42) and (43).

In the seventh embodiment, the negative lens element disposed on the object side in the first lens unit satisfies the condition (44) and the negative lens element disposed on the object side in the second lens unit satisfies the condition (45). Further, the positive lens element disposed at the second object side location in the fourth lens unit satisfies the condition (46).

The eighth embodiment of the present invention has numerical data which is listed below:

eighth embodiment $f = 9.088 \sim 25.454 \sim 71.944, F = 2.0,$
$2\omega = 49.97° \sim 17.81° \sim 6.21°$

| | | |
|---|---|---|
| $r_1 = 85.3064$ | | |
| $d_1 = 2.0000$ | $n_1 = 1.81264$ | $\nu_1 = 25.43$ |
| $r_2 = 49.4318$ | | |
| $d_2 = 6.9893$ | $n_2 = 1.57098$ | $\nu_2 = 71.30$ |
| $r_3 = -493.3354$ | | |
| $d_3 = 0.1000$ | | |
| $r_4 = 44.4729$ | | |
| $d_4 = 5.0402$ | $n_3 = 1.57098$ | $\nu_3 = 71.30$ |
| $r_5 = 159.9973$ | | |
| $d_5 = D_1$ (variable) | | |
| $r_6 = 534.2111$ | | |
| $d_6 = 1.2000$ | $n_4 = 1.60548$ | $\nu_4 = 60.70$ |
| $r_7 = 13.2125$ | | |
| $d_7 = 5.5523$ | | |
| $r_8 = -24.0097$ | | |
| $d_8 = 1.2000$ | $n_5 = 1.60548$ | $\nu_5 = 60.70$ |
| $r_9 = 44.4170$ | | |
| $d_9 = 0.1500$ | | |
| $r_{10} = 28.2387$ | | |
| $d_{10} = 2.5673$ | $n_6 = 1.84281$ | $\nu_6 = 21.00$ |
| $r_{11} = 124.0326$ | | |
| $d_{11} = D_2$ (variable) | | |
| $r_{12} = \infty$ (stop) | | |
| $d_{12} = 1.0000$ | | |
| $r_{13} = -161.4478$ | | |
| $d_{13} = 3.5017$ | $n_7 = 1.88814$ | $\nu_7 = 40.78$ |
| $r_{14} = -42.4520$ | | |
| $d_{14} = 9.0158$ | | |
| $r_{15} = 15.5014$ | | |
| $d_{15} = 2.4985$ | $n_8 = 1.43985$ | $\nu_8 = 94.97$ |
| $r_{16} = 2063.2815$ | | |
| $d_{16} = 1.3557$ | | |
| $r_{17} = -29.4506$ | | |
| $d_{17} = 1.0000$ | $n_9 = 1.85649$ | $\nu_9 = 32.28$ |
| $r_{18} = 92.3301$ | | |
| $d_{18} = D_3$ (variable) | | |
| $r_{19} = 73.9904$ | | |
| $d_{19} = 6.9228$ | $n_{10} = 1.59446$ | $\nu_{10} = 68.30$ |
| $r_{20} = -22.6637$ | | |
| $d_{20} = 0.1475$ | | |
| $r_{21} = 26.7146$ | | |
| $d_{21} = 2.4984$ | $n_{11} = 1.82917$ | $\nu_{11} = 46.62$ |
| $r_{22} = -428.2264$ | | |
| $d_{22} = 1.7902$ | | |
| $r_{23} = -29.2516$ | | |
| $d_{23} = 1.5000$ | $n_{12} = 1.85504$ | $\nu_{12} = 23.78$ |
| $r_{24} = -147.2140$ | | |
| $d_{24} = 2.0000$ | | |
| $r_{25} = \infty$ | | |

-continued f = 9.088 ~ 25.454 ~ 71.944, F = 2.0,
2ω = 49.97° ~ 17.81° ~ 6.21°

| $d_{25}$ = 5.0000 | | $n_{13}$ = 1.51825 | $v_{13}$ = 64.15 |
|---|---|---|---|
| $r_{26}$ = ∞ | | | |
| f | 9.0879 | 25.4541 | 71.9443 |
| $D_1$ | 1.5000 | 23.4931 | 38.4571 |
| $D_2$ | 38.4571 | 16.4634 | 1.5000 |
| $D_3$ | 11.0525 | 8.3227 | 12.3498 |
| $D_3'$ | 10.971 | 7.686 | 8.042 |

The eighth embodiment has a composition similar to that of the seventh embodiment and is configured to be focused by moving the fourth lens unit toward the object side. For this reason, an airspace is reserved between the third lens unit and the fourth lens unit, and a difficulty to reserve the required back focal length is compensated by weakening the refractive power of the third lens unit and strengthening the refractive power of the fourth lens unit. The eighth embodiment which satisfies the conditions (41) through (47) also maintains the high optical performance and small variations of aberrations caused by focusing. The reference symbol $D_3'$ used in the numerical data represents the airspace reserved between the third lens unit and the fourth lens unit when the zoom leas system is focused on an object located at a distance of 1 m by moving the fourth lens unit.

In each of the seventh embodiment and the eighth embodiment, a planar glass plate which is disposed on the image side of the zoom lens system represents a glass plate for protecting an image pickup surface of a solid-state image pickup device, a low pass filter for preventing moiré from being produced by picking up an image with an electronic image pickup device, an infrared cut filter and so on.

It is apparent that the present invention is effective not only for the focusing mode using the fourth lens unit which is adopted for the seventh and eighth embodiments but also for another focusing mode using the third lens unit, a lens component or lens components disposed in the third and/or the fourth lens unit.

Each of the first composition (the first and second embodiments), the second composition (the third and fourth embodiments), the third composition (the fifth and sixth embodiments) and the fourth composition (the seventh and eighth embodiments) of the zoom lens system according to the present invention has a main characteristic in the compositions of the third lens unit and the fourth lens unit.

In contrast, the fifth composition of the zoom lens system according to the present invention has a characteristic mainly in compositions of a first lens unit and a second lens unit.

The fifth composition of the zoom lens system according to the present invention is composed, in order from the object side, of a first lens unit $G_1$ having a positive power, a second lens unit $G_2$ which has a negative power and is moved during zooming monotonously along an optical axis mainly for sharing a vari-focal function, a third lens unit $G_3$ having a positive power, and a fourth lens unit $G_4$ which has a positive power and is moved during zooming in both directions for correcting a deviation of a location of an image surface caused by changing a magnification: and configured to be focused by moving the third lens unit, the fourth lens unit, a lens component or lens components disposed therein: the first lens unit $G_1$ being composed: in order from the object side, of a first lens component $G_{11}$ consisting of a negative meniscus lens element having a convex surface on the object side and a second positive lens component $G_{12}$ which comprises at least one positive lens element, whereas the second lens unit being composed, in order from the object side, of a first negative lens component $G_{21}$ which consists of a negative lens element having higher curvature on an image side surface thereof and a negative lens element, and a second lens component $G_{22}$ in which a positive lens element having higher curvature on an object side surface thereof is disposed on the image side. This zoom lens system is characterized in that it satisfies the conditions listed below:

$0.13 < f_W/f_1 < 0.18$ (51)

$-0.83 < f_W/f_2 < -0.53$ (52)

$0.20 < 1/SF_{1N} < 0.30$ (53)

$0.70 < 1/SF_{2N} < 1.30$ (54)

$-0.80 < 1/SF_{2P} < -0.25$ (55)

The conditions (51) and (52) are required for maintaining the refractive powers of the first lens unit and the second lens unit at adequate values. If $f_W/f_1$ has a small value below the lower limit of the condition (51), a light bundle will not be converged sufficiently by the first lens unit and allowed to be incident on the second lens unit, remarkable aberrations will be produced due to the strong negative refractive power of the second lens unit and it will be impossible to correct remarkable negative distortion produced by the second lens unit at the wide position. If $f_W/f_1$ has a large value exceeding the upper limit of the condition (51), in contrast, it will undesirably be difficult to reserved a required back focal length without excessively strengthening the refractive power of the second lens unit.

If $f_W/f_2$ has a large value exceeding the upper limit of the condition (52), the second lens unit will have an insufficient refractive power, thereby making it difficult to configure the zoom lens system compactly and reserve the required back focal length even by contriving composition of the other lens units. If $f_W/f_2$ has a small value below the lower limit of the condition (52), in contrast, it will be advantageous for configuring the loom lens system compactly and reserving the required back focal length, but the refractive power of the third lens unit or the fourth lens unit must be strengthened, thereby aggravating aberrations and making it impossible to maintain the high optical performance.

Further, it is desirable that the negative lens element disposed on the object side in the fast lens unit satisfies the condition (53). The condition (53) defines a shape for this negative lens element. If $1/SF_{1N}$ has a large value exceeding the upper limit of the condition (53), positive astigmatism and negative distortion will be remarkable at the wide position, and positive spherical aberration and positive astigmatism will be aggravated at the tele position. If $1/SF_{1N}$ has a small value exceeding the lower limit of the condition (53), negative spherical aberration will undesirably be aggravated at the tele position.

Further, it is desirable that the negative lens element disposed on the object side in the second lens unit satisfies the condition (54) and the positive lens element disposed on the image side satisfies the condition (55).

The condition (54) defines a shape for the negative lens element. If $1/SF_{2N}$ has a large value exceeding the upper limit of the condition (54), negative distortion and positive astigmatism will be remarkable at the wide position, positive astigmatism and a variation of spherical aberration will be remarkable at the tele position, and it will be difficult to correct these aberrations with the other lens units. If $1/SF_{2N}$ has a small value below the lower limit of the condition (54), positive astigmatism and negative distortion at the wide position as well as positive spherical aberration and negative astigmatism will undesirably be aggravated at the tele position.

The condition (55) defines a shape for the positive lens element disposed on the image side in the second lens unit. If $1/SF_{2P}$ has a large value exceeding the upper limit of the condition (55), it will be difficult to correct negative astigmatism at the wide position and negative spherical aberration at the tele position. If $1/SF_{2P}$ has a small value below the lower limit of the condition (55), positive astigmatism at the wide position and positive spherical aberration at the tele position will undesirably be aggravated.

For maintaining higher optical performance of the zoom lens system according to the present invention, it is desirable to satisfy conditions (51-1) through (55-1) in place of the conditions (51) through (55):

$$0.13 < f_W/f_1 < 0.17 \quad (51\text{-}1)$$

$$-0.77 < f_W/f_2 < -0.56 \quad (52\text{-}1)$$

$$0.23 < 1/SF_{1N} < 0.28 \quad (53\text{-}1)$$

$$0.80 < 1/SF_{2N} < 1.10 \quad (54\text{-}1)$$

$$-0.65 < 1/SF_{2P} < -0.40 \quad (55\text{-}1)$$

An embodiment (ninth embodiment) of the zoom lens system according to the present invention which has the fifth composition is illustrated in FIG. 2. The zoom lens system preferred as this embodiment has a composition which is the same as that of the second embodiment, uses third and fourth lens units which have the characteristic of the first composition in combination with a first and second lens units which have a characteristic of the fifth composition described below. This zoom lens system is configured so as to satisfy the conditions (51), (52), (53), (54) and (55).

This zoom lens system is composed, in order from the object side, of a first lens unit $G_1$ having a positive refractive power, a second lens unit $G_2$ which has a negative refractive power and is moved during zooming monotonously along an optical axis for changing a magnification, a third lens unit $G_3$ having a positive refractive power, a fourth lens unit which has a positive refractive power and is moved during zooming in both directions along the optical axis for correcting a location of an image surface as shown in FIG. 2. The first lens unit $G_1$ is composed, in order from the object side, of a first lens component $G_{11}$ consisting of a negative meniscus lens element having a convex surface on the object side and a second lens component $G_{12}$ consisting of two positive lens elements having higher curvature on object side surfaces thereof, whereas the second lens unit $G_2$ is composed, in order from the object side, of a first negative lens component $G_{21}$ consisting of a negative lens element having higher curvature on an image side surface thereof and a negative lens element, and a second positive lens component $G_{22}$ consisting of a positive lens element having higher curvature on an object side surface thereof. The third lens unit $G_3$ is composed, in order from the object side, of too positive lens elements and a negative lens element, whereas the fourth lens unit is composed, in order from the object side, of a negative lens element and two positive less elements.

This zoom lens system is configured to be focused by moving the fourth lens unit $G_1$ toward the object side while being capable of maintaining its optical performance so that it is scarcely degraded by focusing since it avoids imposing excessive aberration correcting burdens on the third lens unit $G_3$ and the fourth lens unit $G_4$ by selecting an adequate composition for the second lens unit $G_2$.

Figure 6:
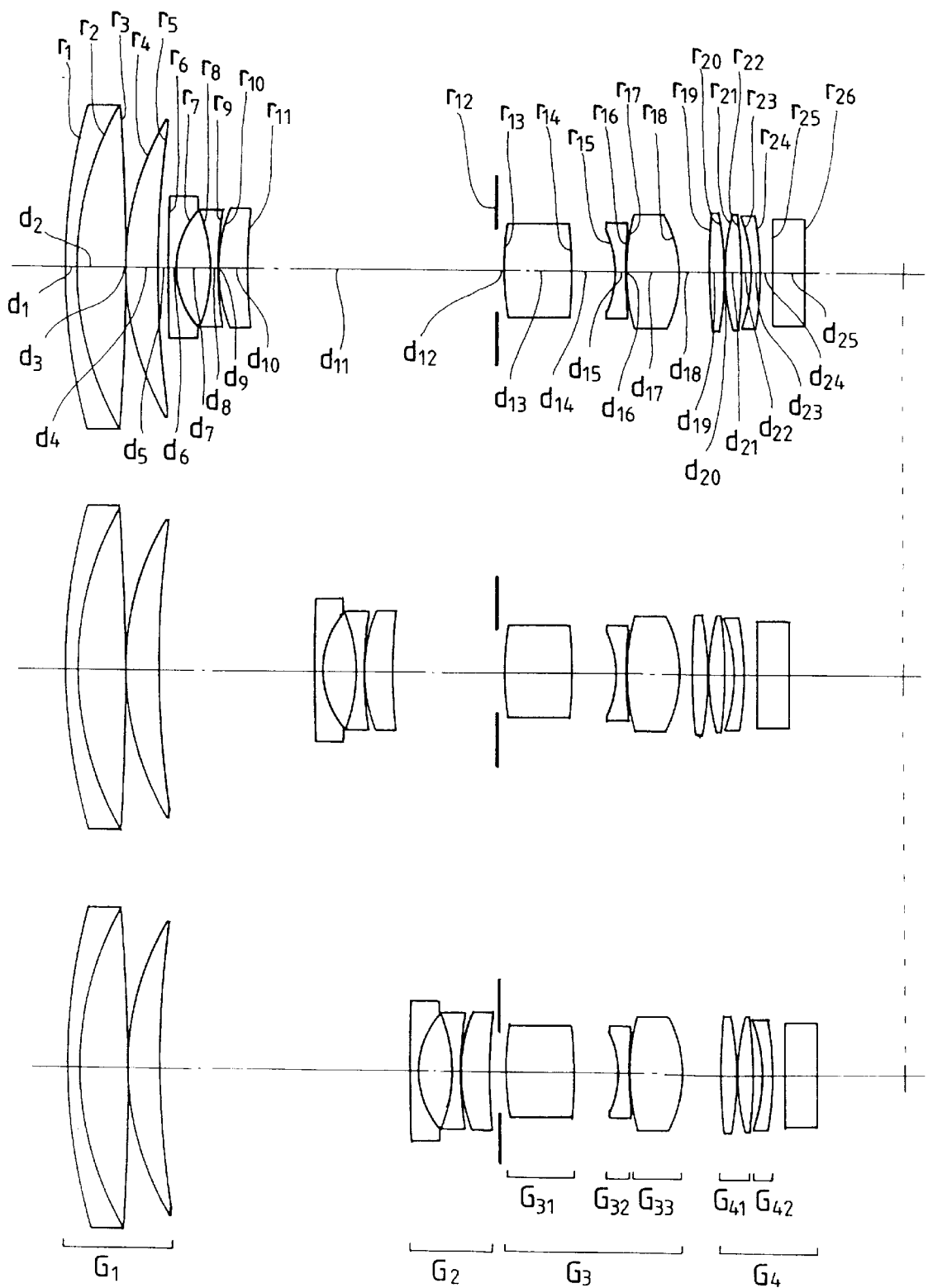

Another embodiment (tenth embodiment) of the zoom lens system according to the present invention which has the fifth composition has the same composition as that of sixth embodiment shown in FIG. 6, and not only the characteristic of the sixth embodiment but also the characteristic of the fifth composition in first and second lens units of the zoom lens system.

Differently from the embodiment which has the fifth composition shown in FIG. 2 (ninth embodiment), the third lens unit is composed, in order from the object side, of a positive lens element, a negative led element and a positive lens element, whereas the fourth lens unit is composed, in order from the object side, of two positive lens elements and a negative lens element as illustrated in FIG. 6.

Still another embodiment (eleventh embodiment) of the zoom lens system according to the present invention which has the fifth composition has a composition shown in FIG. 8 which is the same as that of the sixth embodiment and not only the characteristic of the composition of the fourth composition but also the characteristic of the fifth composition in a first lens unit and a fifth lens unit as described below.

Differently from the embodiment which has the fifth composition shown in FIG. 2 (ninth embodiment): a third lens unit is composed, in order from the object side, of two positive lens components and a negative lens element, and a fourth lens unit which is composed, in order from the object side, of two positive lens elements and a negative lens element as shown in FIG. 8.

This embodiment is configured to satisfy the conditions (51) through (55), thereby maintaining high optical performance and small variations of aberrations to be caused by focusing.

Still another embodiment (twelfth embodiment) of the zoom lens system according to the present invention has a composition illustrated in FIG. 4 which is the same as that of the fourth embodiment. This embodiment has not only the characteristic of the second composition but also the characteristic of the fifth composition as described below.

This embodiment uses, differently from the embodiment which has the fifth composition shown in FIG. 2 (ninth embodiment), a third lens unit which is composed, in order from the object side, of a positive lens element, a negative lens element and a positive lens element, and a fourth lens element which is composed, in order from the object side, a positive lens element, a negative lens element and a positive lens element as shown in FIG. 4.

The embodiment which is configured also to satisfy the conditions (51) through (55) maintains high optical performance and small variations of aberrations caused by focusing.

A planar glass plate disposed on the image side of the zoom lens system in each of the embodiments (ninth through twelfth embodiments)described above represents a glass plate for protecting an image pickup surface of a solid-stage image pickup device, a low pass filter for preventing moiré from being produced by picking up an image with an electronic image pickup device, an infrared cut filter and so on.

These embodiments can adopt not only the focusing mode using the fourth lens unit but also another focusing mode in which the third lens unit is moved along an optical axis or still another focusing mode in which a lens component or lens components disposed in the third lens unit and/or the fourth lens unit is or are moved.

Though each of the embodiments is composed only of spherical lens elements, the compositions of the third lens unit and/or the fourth lens unit in particular can be further simplified by using an a spherical lens element or a spherical lens elements. Further, it is apparent that the zoom lens system according to the present invention can be composed of graded refractive index optical materials.

Each of the embodiments of the zoom lens system which has the fifth composition can be focused by moving the third lens unit, the fourth lens unit or at least one of the lens components disposed therein.

The zoom lens system according to the present invention which has any one of the first through the fifth compositions is optimum for use with video cameras, still video cameras and electronic cameras which use image pickup devices having a large number of picture elements suited for picking up highly precise and minute images obtainable these days, and has a compact and simple composition.

I claim:

1. A zoom lens system comprising, in order from the object side:

a first lens unit having a positive power;

a second lens unit which has a negative power and is moved during zooming monotonously along an optical axis mainly for sharing a vari-focal function;

a third lens unit having a positive power; and a fourth lens unit which has a positive power and is moved during zooming axially in both directions for correcting a deviation of an image surface caused by changing a magnification, wherein said zoom lens system is focused by moving the third lens unit, the fourth lens unit or at least one of lens components disposed in the third and fourth lens units, said second lens unit comprises, in order from the object side, a negative lens element having higher curvature on an image side surface thereof, a negative lens element, and a positive lens element having higher curvature on an object side surface thereof, said third lens unit is composed, in order from the object side, of a first positive lens component which comprises at least one positive lens element and a second negative lens component which comprises at least one negative lens element, said fourth lens unit is composed, in order from the object side, of a first negative lens component which comprises at least one negative lens element and a second positive lens component which comprises at least one positive lens element, and said zoom lens system satisfies the following conditions (11), (12), (13) and (16-1):

$$-0.80 < f_W/f_2 < -0.55 \quad (11)$$

$$-0.70 < f_4/f_{4N} < -0.30 \quad (12)$$

$$0.60 < f_{4P}/f_4 < 0.70 \quad (13)$$

$$-0.80 < 1/SF_{2P} < -0.40 \quad (16\text{-}1)$$

wherein the reference symbol $f_W$ represents a focal length of the zoom lens system as a whole at a wide position thereof, the reference symbol $f_2$ designates a focal length of the second lens unit, the reference symbol $f_4$ denotes a focal length of the fourth lens unit, the reference symbol $f_{4N}$ represents a total focal length of the first negative lens component of the fourth lens unit, the reference symbol $f_{4P}$ designates a total focal length of the second positive lens component of the fourth lens unit and the reference symbol $SF_{2P}$ denotes a shaping factor for the positive lens element disposed in said second lens unit which is given by the formula $$SF=(r_a+r_b)/(r_a-r_b)$$

wherein the reference symbols $r_a$ and $r_b$ represent radii of curvature on an object side surface and an image side surface respectively of the positive lens element disposed in said second lens unit.

2. A zoom lens system according to claim 1 wherein said first lens unit comprises, in order from the object side, a first negative meniscus lens component and a second positive lens component which comprises at least one positive lens element and wherein the first lens unit satisfies the following condition (14):

$$0.0 < 1/SF_{1N} < 0.42 \quad (14)$$

wherein the reference symbol $SF_{1N}$ represents a shaping factor SF for the negative meniscus lens element disposed in the first lens unit which is given by the formula $$SF=(r_a+r_b)/(r_a-r_b)$$

wherein the reference symbol $r_a$ and $r_b$ represent radii of curvature on an object side surface and an image side surface of the negative meniscus lens element.

3. A zoom lens system according to claim 1 wherein said second lens unit comprises, in order from the object side, a negative lens element having higher curvature on an image side surface thereof, a negative lens element, and a positive lens element having higher curvature on an object side surface thereof, and satisfies the following conditions (15) and (16):

$$0.65 < 1/SF_{2N} < 1.80 \quad (15)$$

$$-1.00 < 1/SF_{2P} < -0.30 \quad (16)$$

wherein the reference symbols $SF_{2N}$ and $SF_{2P}$ represent shaping factors SF for the negative lens element and the positive lens element disposed on the object side and the image side in the second lens unit, which are given by the formula $$SF=(r_a+r_b)/(r_a-r_b)$$

wherein the reference symbols $r_a$ and $r_b$ represent radii of curvature on an object side surface and an image side surface of the negative lens element and the positive lens element respectively.

4. A zoom lens system according to claim 1, wherein the negative lens element disposed on the object side in said fourth lens unit satisfies the following condition (17):

$$0.20 < 1/SF_{4N} < 1.00 \quad (17)$$

wherein the reference symbol $SF_{4N}$ represents a shaping factor for the negative lens element disposed in the fourth lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

5. A zoom lens system according to claim 1, wherein said first lens unit comprises, in order from the object side, a first lens component consisting of a negative meniscus lens element having a convex surface on the object side and a second positive lens component comprising at least one positive lens element, and satisfies the following condition (14-1):

$$0.2 < 1/SF_{1N} < 0.3 \tag{14-1}$$

wherein the reference symbol $SF_{1N}$ represents a shaping factor for said negative lens element disposed in the first lens unit, which is given by the formula $$SF=(r_a+r_b)/(r_a-r_b)$$

wherein the reference symbols $r_a$ and $r_b$ represent radii of curvature on an object side surface and an image side surface respectively of the negative meniscus lens element.

6. A zoom lens system according to claim 1, wherein said second lens unit comprises a lens component comprising, in order from the object side, a negative lens element having higher curvature on an image side surface thereof, a negative lens element, and a positive lens element which is disposed on the image side and has higher curvature on an object side surface thereof, and satisfies the following condition (15-1):

$$0.65 < 1/SF_{2N} < 1.30 \tag{15-1}$$

wherein the reference symbol $SF_{2N}$ represents a shaping factor SF for the negative lens element disposed on the object side in the second lens unit, which is given by the formula $$SF=(r_a+r_b)/(r_a-r_b)$$

wherein the reference symbols $r_a$ and $r_b$ represent radii of curvature on an object side surface and an image side surface of the negative meniscus lens element.

7. A zoom lens system according to claim 1, wherein the negative lens element disposed on the object side in said fourth lens unit satisfies the following condition (17-1):

$$0.30 < 1/SF_{4N} < 0.60 \tag{17-1}$$

wherein the reference symbol $SF_{4N}$ represents a shaping factor for the negative lens element disposed in the fourth lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

8. A zoom lens system according to claim 1, wherein the positive lens element disposed in the second lens component of said fourth lens unit satisfies the following condition (18):

$$0.7 < d/f_W < 2.0 \tag{18}$$

wherein the reference symbol d represents a thickness of said positive lens element.

9. A zoom lens system according to claim 1, wherein the positive lens element disposed in the second lens component of said fourth lens unit satisfies the following condition (18-1):

$$1.0 < d/f_W < 2.0 \tag{18-1}$$

wherein the reference symbol d represents a thickness of said positive lens element.

10. A zoom lens system comprising, in order from the object side: a first lens unit having a positive power; a second lens unit which has a negative power and is moved during zooming monotonously along an optical axis mainly for sharing a vari-focal function; a third lens unit having a positive power, and a fourth lens unit which has a positive power and is moved during zooming for correcting a deviation of a location of an image surface, wherein said zoom lens system is configured to be focused by moving the third lens unit, the fourth lens unit or at least one of lens components disposed in the third lens unit and the fourth lens unit, wherein said third lens unit is composed, in order from the object side, of a first positive lens component which comprises at least one positive lens element and a second negative lens component which comprises at least one negative lens element and a third positive lens component which comprises at least one positive lens element, wherein said fourth lens unit is composed, in order from the object side, of a first positive lens component which comprises at least one positive lens element, a second negative lens component which comprises at least one negative lens element and a third positive lens component which comprises at least one positive lens element, and wherein said zoom lens system satisfies the following conditions (21) through (25):

$$-0.67 < f_W/f_2 < -0.56 \tag{21}$$

$$-0.80 < f_W/f_{3N} < -0.30 \tag{22}$$

$$0.50 < f_{3P1}/f_{3P2} < 1.30 \tag{23}$$

$$-0.25 < f_W/f_{4N} < -0.04 \tag{24}$$

$$0.10 < f_{4P1}/f_{4P2} < 1.00 \tag{25}$$

wherein the reference symbols $f_W$, $f_2$, $f_{3N}$, $f_{3P1}$, $f_{3P2}$, $f_{4N}$, $f_{4P1}$ and $f_{4P2}$ represent a focal length of the zoom lens system as a whole at a wide position thereof, a focal length of the second lens unit, a focal length of the second negative lens component of the third lens unit, a focal length of the first positive lens component of the third lens unit, a focal length of the third positive lens component of the third lens unit, a focal length of the second negative lens component of the fourth lens unit, a focal length of the first positive lens component of the fourth lens unit and a focal length of the third positive lens component of the fourth lens unit respectively.

11. A zoom lens system according to claim 10, wherein said first lens unit is composed, in order from the object side, of a first lens component which consists of a negative meniscus lens element having a convex surface on the object side and a second positive lens component which comprises at least one positive lens element, and satisfies the following condition (26):

$$0.06 < 1/SF_{1N} < 0.45 \tag{26}$$

wherein the reference symbol $SF_{1N}$ represents a shaping factor SF for the negative meniscus lens element disposed on the object side in the first lens unit, which is expressed by the formula $$SF=(r_a+r_b)/(r_a-r_b)$$

wherein the reference symbols $r_a$ and $r_b$ represent radii of curvature on an object side surface and an image side surface respectively of a lens element.

12. A zoom lens system according to claim 11, wherein the second lens unit is composed, in order from the object side, of a negative lens element having higher curvature on an image side surface thereof, a negative lens element and a lens component comprising a positive lens element having higher curvature on an object side surface thereof, and satisfies the following conditions (27) and (28):

$$0.5 < 1/SF_{2N} < 3.0 \tag{27}$$

$$-1.0 < 1/SF_{2P} < -0.2 \tag{28}$$

wherein the reference symbols $SF_{2N}$ and $SF_{2P}$ represent shaping factors for the negative lens element disposed on the object side and the positive lens element disposed on the image side respectively in the second lens unit, wherein a shaping factor SF is expressed by the formula $$SF = (r_a + r_b)/(r_a - r_b)$$

wherein the reference symbols $r_a$ and $r_b$ represent radii of curvature on an object side surface and an image side surface of a lens element.

13. A zoom lens system according to claim 11 satisfying the following condition (26-1):

$$0.10 < 1/SF_{1N} < 0.28 \tag{26-1}$$

wherein the reference symbol $SF_{1N}$ represents a shaping factor SF for the negative meniscus lens element disposed on the object side in the first lens unit, which is expressed by the formula $$SF = (r_a + r_b)/(r_a - r_b)$$

wherein the reference symbols $r_a$ and $r_b$ represent radii of curvature on an object side surface and an image side surface respectively of a lens element.

14. A zoom lens system according to claim 12 satisfying the following conditions (27-1) and (28-1):

$$0.6 < 1/SF_{2N} < 1.4 \tag{27-1}$$

$$-0.7 < 1/SF_{2P} < -0.3 \tag{28-1}$$

wherein the reference symbols $SF_{2N}$ and $SF_{2P}$ represent shaping factors for the negative lens element disposed on the object side and the positive lens element disposed on the image side respectively in the second lens unit, wherein a shaping factor SF is expressed by the formula $$SF = (r_a + r_b)/(r_a - r_b)$$

wherein the reference symbols $r_a$ and $r_b$ represent radii of curvature on an object side surface and an image side surface of a lens element.

15. A zoom lens system according to claim 13, wherein the second lens unit is composed in order from the object side of a negative lens element having higher curvature on an image side surface thereof, a negative lens element and a lens component comprising a positive lens element having higher curvature on an object side surface thereof, and satisfies the following conditions (27-1) and (28-1):

$$0.6 < 1/SF_{2N} < 1.4 \tag{27-1}$$

$$-0.7 < 1/SF_{2P} < -0.3 \tag{28-1}$$

wherein the reference symbols $SF_{2N}$ and $SF_{2P}$ represent shaping factors for a negative lens element disposed on the object side and a positive lens element disposed on the image side respectively in the second lens unit, wherein a shaping factor SF is expressed by the following formula $$SF = (r_a + r_b)/(r_a - r_b)$$

wherein the reference symbols $r_a$ and $r_b$ represent radii of curvature on an object side surface and an image side surface of a lens element.

16. A zoom lens system according to claim 10, 12, 14 or 15 satisfying the following condition (29):

$$-0.4 < 1/SF_{4N} < -0.1 \tag{29}$$

wherein the reference symbol $SF_{4N}$ represents a shaping factor SF for the negative lens element disposed in said negative lens component in the fourth lens unit, wherein a shaping factor SF is expressed by the formula $$SF = (r_a + r_b)/(r_a - r_b)$$

wherein the reference symbols $r_a$ and $r_b$ represent radii of curvature on an object side and an image side surface of a lens element.

17. A zoom lens system according to claim 10, 11, 12, 13, 14 or 15, wherein the lens unit which moves when conducting focusing comprises at least one lens element which satisfies the following condition (30):

$$0.7 < d/f_W < 2.0 \tag{30}$$

wherein the reference symbol d represents a thickness of a central portion of the at least one lens element.

18. A zoom lens system according to claim 17, wherein the lens unit which moves when conducting focusing comprises at least one lens element which satisfies the following condition (30-1):

$$1.0 < d/f_W < 2.0 \tag{30-1}$$

wherein the reference symbol d represents a thickness of a central portion of the at least one lens element.

19. A zoom lens system according to claim 11 satisfying the following condition (29):

$$-0.4 < 1/SF_{4N} < -0.1 \tag{29}$$

wherein the reference symbol $SF_{4N}$ represents a shaping factor SF for the negative lens element disposed in said second negative lens component in the fourth lens unit;

a shaping factor SF is expressed by the formula $$SF = (r_a + r_b)/(r_a - r_b)$$

wherein the reference symbols $r_a$ and $r_b$ represent radii of curvature on an object side surface and an image side surface of a lens element.

20. A zoom lens system according to claim 16, wherein a lens unit which moves when focusing is conducted comprises at least one lens element which satisfies the following condition (30):

$$0.7 < d/f_W < 2.0 \tag{30}$$

wherein the reference symbol d represents a thickness of a central portion of the at least one lens element.

21. A zoom lens system comprising, in order from the object side: a first lens unit having a positive power; a second lens unit which has a negative power and is moved during zooming monotonously along an optical axis mainly for sharing a vari-focal function; a third lens unit having a positive power; and a fourth lens unit which has a positive power and is moved during zooming axially in both directions for correcting a deviation of a location of an image surface caused by changing a magnification, wherein said zoom lens system is focused by moving the third lens unit, the fourth lens unit or at least one of lens components disposed in the third lens unit and the fourth lens unit, wherein said third lens unit is composed, in order from the object side, of a first positive lens component which comprises at least one positive lens element, a second negative lens component which comprises at least one negative lens element and a third positive lens component which comprises at least one positive lens element, wherein said fourth lens unit is composed, in order from the object side, of a first positive lens component which comprises at least one positive lens element and a second negative lens component which comprises at least one negative lens element, and wherein said zoom lens system satisfies the following conditions:

$$-0.67 < f_W/f_2 < -0.50 \tag{31}$$

$$-0.67 < f_W/f_{3N} < -0.35 \tag{32}$$

$$0.50 < f_{3P1}/f_{3P2} < 2.00 \tag{33}$$

$$-0.40 < f_W/f_{4N} < -0.10 \tag{34}$$

wherein the reference symbols $f_W$, $f_2$, $f_{3N}$, $f_{3P1}$, $f_{3P2}$ and $f_{4N}$ represent a focal length of the zoom lens system as a whole at a wide position thereof, a focal length of the second lens unit, a focal length of the second negative lens component of the third lens unit, a focal length of the first positive lens component of the third lens unit, a focal length of the third positive lens component of the third lens unit, and a focal length of the second negative lens component of the fourth lens unit.

22. A zoom lens system according to claim 21, wherein the first lens unit is composed, in order from the object side, of a first lens component which consists of a negative meniscus lens element having a convex surface on the object side and a second positive lens component which comprises at least one positive lens element, and satisfies the following condition (35):

$$0.00 < 1/SF_{1N} < 0.45 \tag{35}$$

wherein the reference symbol $SF_{1N}$ represents a shaping factor SF for the negative meniscus lens element disposed on the object side in the first lens unit, which is expressed by the formula $$SF = (r_a + r_b)/(r_a - r_b)$$

wherein the reference symbols $r_a$ and $r_b$ represent radii of curvature on an object side surface and an image side surface respectively of a lens element.

23. A zoom lens system according to claim 22, wherein the second lens unit is composed, in order from the object side, of a first lens component which consists of a negative lens element having higher curvature on an image side surface thereof and a negative lens element and a second lens component which comprises a positive lens element disposed on the image side and having higher curvature on an object side surface thereof, and satisfies the following conditions (36) and (37):

$$0.6 < 1/SF_{2N} < 2.0 \tag{36}$$

$$-2.0 < 1/SF_{2P} < -0.3 \tag{37}$$

wherein the reference symbols $SF_{2N}$ and $SF_{2P}$ represent shaping factors for the negative lens element disposed on the object side and the positive lens element disposed on the image side respectively in the second lens unit, wherein a shaping factor SF is expressed by the formula $$SF = (r_a + r_b)/(r_a - r_b)$$

wherein the reference symbols $r_a$ and $r_b$ represent radii of curvature on an object side surface and an image side surface of a lens element.

24. A zoom lens system according to claim 23, wherein the second lens unit is composed, in order from the object side, of a first lens component which consists of a negative lens element having higher curvature on an image side surface thereof and a negative lens element and a second lens component which comprises a positive lens element disposed on the image side and having higher curvature on an object side surface thereof, and satisfies the following conditions (36) and (37):

$$0.6 < 1/SF_{2N} < 2.0 \tag{36}$$

$$-2.0 < 1/SF_{2P} < -0.3 \tag{37}$$

wherein the reference symbols $SF_{2N}$ and $SF_{2P}$ represent shaping factors for the negative lens element disposed on the object side and the positive lens element disposed on the image side respectively in the second lens unit, wherein a shaping factor SF is expressed by the formula $$SF = (r_a + r_b)/(r_a - r_b)$$

wherein the reference symbols $r_a$ and $r_b$ represent radii of curvature on an object side surface and an image side surface of a lens element.

25. A zoom lens system according to claim 21 or 22, satisfying the following condition (38):

$$--1.5 < 1/SF_{4N} < -0.2 \tag{38}$$

wherein the reference symbol $SF_{4N}$ represents a shaping factor SF for the negative lens element disposed in said negative lens component in the fourth lens unit, wherein a shaping factor SF is expressed by the formula $$SF = (r_a + r_b)/(r_a - r_b)$$

wherein the reference symbols $r_a$ and $r_b$ represent radii of curvature on an object side and an image side surface of a lens element.

26. A zoom lens system according to claim 24, satisfying the following condition (38):

$$--1.5 < 1/SF_{4N} < -0.2 \tag{38}$$

wherein the reference symbol $SF_{4N}$ represents a shaping factor SF for the negative lens element disposed in said negative lens component in the fourth lens unit, wherein a shaping factor SF is expressed by the formula $$SF=(r_a+r_b)/(r_a-r_b)$$

wherein the reference symbols $r_a$ and $r_b$ represent radii of curvature on an object side and an image side surface of a lens element.

27. A zoom lens system according to claim 21, wherein the first lens unit is composed, in order from the object side, of a first lens component which consists of a negative meniscus lens element having a convex surface on the object side and a second lens component which comprises at least one positive lens element, and satisfies the following condition (35-1):

$$0.10<1/SF_{1N}<0.35 \qquad (35\text{-}1)$$

wherein the reference symbol $SF_{1N}$ represents a shaping factor SF for the negative meniscus lens element disposed on the object side in the first lens unit, which is expressed by the formula $$SF=(r_a+r_b)/(r_a-r_b)$$

wherein the reference symbols $r_a$ and $r_b$ represent radii of curvature on an object side surface and an image side surface respectively of a lens element.

28. A zoom lens system according to claim 21 or 22, wherein the second lens unit is composed, in order from the object side, of a first lens component which consists of a negative lens element having higher curvature on an image side surface thereof and a negative lens element and a second lens component which comprises a positive lens element disposed on the image side and having higher curvature on an object side surface thereof, and satisfies the following conditions (36-1) and (37-1):

$$0.7<1/SF_{2N}<1.5 \qquad (36\text{-}1)$$

$$-0.7<1/SF_{2P}<-0.4 \qquad (37\text{-}1)$$

wherein the reference symbols $SF_{2N}$ and $SF_{2P}$ represent shaping factors for the negative lens element disposed on the object side and the positive lens element disposed on the image side respectively in the second lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

29. A zoom lens system according to claim 25, wherein the second lens unit is composed, in order from the object side, of a first lens component which consists of a negative lens element having higher curvature on an image side surface thereof and a negative lens element and a second lens component which comprises a positive lens element disposed on the image side and having higher curvature on an object side surface thereof, and satisfies the following conditions (36-1) and (37-1):

$$0.7<1/SF_{2N}<1.5 \qquad (36\text{-}1)$$

$$-0.7<1/SF_{2P}<-0.4 \qquad (37\text{-}1)$$

wherein the reference symbols $SF_{2N}$ and $SF_{2P}$ represent shaping factors for the negative lens element disposed on the object side and the positive lens element disposed on the image side respectively in the second lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

30. A zoom lens system according to claim 21, 22, 26 or 27 satisfying the following condition (38-1):

$$-1.0<1/SF_{4N}<-0.25 \qquad (38\text{-}1)$$

wherein the reference symbol $SF_{4N}$ represents a shaping factor SF for the negative lens element disposed on the object side in the fourth lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

31. A zoom lens system according to claim 23 satisfying the following condition (38-1):

$$-1.0<1/SF_{4N}<-0.2 \qquad (38\text{-}1)$$

wherein the reference symbol $SF_{4N}$ represents a shaping factor SF for the negative lens element disposed on the object side in the fourth lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

32. A zoom lens system comprising in order from the object side: a first lens unit having a positive power; a second lens unit which has a negative power and is moved during zooming monotonously along an optical axis mainly for sharing a vari-focal function; a third lens unit having a positive power; and a fourth lens unit which has a positive power and is moved during zooming axially in both directions for correcting a deviation of a location of an image surface caused by changing a magnification, wherein said zoom lens system is focused by moving the third lens unit, the fourth lens unit or at least one of lens components disposed in the third lens unit and the fourth lens unit, wherein said third lens unit is composed, in order from the object side, of a first positive lens component which comprises at least one positive lens element and a second negative lens component which comprises at least one negative lens element, wherein said fourth lens unit is composed, in order from the object side, of a first positive lens component which comprises at least one positive lens element and a second negative lens component which comprises at least one negative lens element, and wherein said zoom lens system satisfies the following conditions:

$$-0.65<f_W/f_2<-0.50 \qquad (41)$$

$$0.20<f_{3P}/f_3<0.40 \quad (42)$$

$$-0.60<f_{3N}/f_3<-0.10 \quad (43)$$

wherein the reference symbols $f_W$, $f_2$, $f_3$, $f_{3P}$ and $f_{3N}$ represent a focal length of the zoom lens system as a whole at a wide position thereof, a focal length of the second lens unit, a focal length of the third lens unit, a focal length of the first positive lens component of the third lens unit and a focal length of the second negative lens component of the third lens unit respectively.

33. A zoom lens system according to claim 32, wherein the first lens unit is composed, in order from the object side, of a first lens component which consists of a negative meniscus lens element having a convex surface on the object side and a second positive lens component which comprises at least one positive lens element, and satisfies the following condition (44):

$$0.1<1/SF_{1N}<0.4 \quad (44)$$

wherein the reference symbol $SF_{1N}$ represents a shaping factor SF for the negative meniscus lens element disposed on the object side in the first lens unit, SF being expressed by the formula:

$$SF=(r_a+r_b)/(r_a-r_b)$$

wherein the reference symbols $r_a$ and $r_b$ represent radii of curvature on an object side surface and an image side surface of a lens element.

34. A zoom lens system according to claim 32 or 33 wherein the second lens unit is composed, in order from the object side, of a first lens component which consists of a negative lens element having higher curvature on an image side surface thereof and a negative lens component, and a second lens component successive thereto; said second lens unit satisfying the following condition (45):

$$0.1<1/SF_{21}<1.6 \quad (45)$$

wherein the reference symbol $SF_{21}$ represents a shaping factor for the negative lens element disposed on the object side in the second lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

35. A zoom lens system according to claim 32 or 33 wherein the second lens unit is composed, in order from the object side, of a first lens component which consists of a negative lens element having higher curvature on an image side surface thereof and a negative lens element, and a second lens component successive thereto; said second lens unit satisfying the following condition (45-1):

$$0.4<SF_{21}<1.5 \quad (45\text{-}1)$$

wherein the reference symbol $SF_{21}$ represents a shaping factor SF for the negative lens element disposed on the object side in the second lens unit.

wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

36. A zoom lens system according to claim 32 or 33 wherein the fourth lens unit is composed, in order from the object side, of a first positive lens component which comprises at least two positive lens elements and a second negative lens component which comprises at least one negative lens element, said fourth lens unit satisfying the following condition (46):

$$-2.0<SF_{42}<-0.5 \quad (46)$$

wherein the reference symbol $SF_{42}$ represents a shaping factor SF for the positive lens element disposed at the second object side location in the fourth lens unit, wherein a shaping factor SF is expressed by the formula $$SF=(r_a+r_b)/(r_a-r_b)$$

wherein the reference symbols $r_a$ and $r_b$ represent radii of curvature on an object side surface and an image side surface of a lens element.

37. A zoom lens system according to claim 34, wherein the fourth lens unit is composed, in order from the object side, of a first positive lens component which comprises at least two positive lens elements and a second negative lens component which comprises at least one negative lens element, and satisfies the following condition (46):

$$-2.0<SF_{42}<-0.5 \quad (46)$$

wherein the reference symbol $SF_{42}$ represents a shaping factor SF for a positive lens element disposed at the second from the object side location in the fourth lens unit.

38. A zoom lens system comprising, in order from the object side:

first lens unit having a positive power;

a second lens unit which has a negative power and is moved during zooming monotonously along an optical axis mainly for sharing a vari-focal function;

a third lens unit having a positive power; and a fourth lens unit which has a positive power and is moved during zooming axially in both directions for correcting a deviation of an image surface caused by changing a magnification, wherein said zoom lens system is focused by moving the third lens unit, fourth lens unit or at least one of lens components disposed in the third lens unit and the fourth lens unit, wherein said first lens unit is composed, in order from the object side, of a first lens component which comprises a negative meniscus lens element disposed on the object side and having a convex surface on the object side, and a second positive lens component which comprises at least one positive lens element, said second lens unit is composed, in order from the object side, of a first lens component which consists of a negative lens element having a higher curvature on an image side surface thereof and a negative lens element, and a second lens component which is successive to the first lens component and comprises a positive lens element having higher curvature on an object side surface thereof, and said zoom lens system satisfies the following conditions:

$0.13 < f_W/f_1 < 0.18$ (51)

$-0.83 < f_W/f_2 < -0.53$ (52)

$0.23 < 1/SF_{1N} < 0.28$ (53-1)

$0.70 < SF_{2N} < 1.30$ (54)

$-0.80 < 1/SF_{2P} < -0.25$ (55)

wherein the reference symbols $f_W$, $f_1$, $f_2$, $SF_{1N}$, $SF_{2N}$, and $SF_{2P}$ represent a focal length of the zoom lens system as a whole at a wide position thereof, a focal length of the first lens unit, a focal length of the second lens unit, a shaping factor for the negative meniscus lens element disposed on the object side in the first lens unit, a shaping factor for the negative lens element disposed on the object side in the second lens unit and a shaping factor for the positive lens element disposed on the image side in the second lens unit, wherein a shaping factor SF is expressed by the formula $$SF = (r_a + r_b)/(r_a - r_b)$$

wherein the reference symbols $r_a$ and $r_b$ represent radii of curvature on an object side surface and an image side surface respectively of the positive lens element.

39. A zoom lens system according to claim 38 wherein said first lens unit comprises two positive lens elements having higher curvature on object side surfaces thereof which are disposed just after said negative meniscus lens element and the second lens component of said second lens unit consists of a positive lens element having higher curvature on an object side surface thereof.

40. A zoom lens system according to claim 32, 33, or 38 wherein said zoom lens system is focused by moving said fourth lens unit toward the object side.

41. A zoom lens system comprising in order from the object side:

a first lens unit having a positive power;

a second lens unit which has a negative power and is moved during zooming monotonously along an optical axis mainly for sharing a vari-focal function;

a third lens unit having a positive power; and a fourth lens unit which has a positive power and is moved during zooming axially in both directions for correcting a deviation of a location of an image surface caused by changing a magnification, wherein said zoom lens system is focused by moving the third lens unit, the fourth lens unit or at least one of lens components disposed in the third lens unit and the fourth lens unit, wherein said first lens unit is composed, in order from the object side, of a first lens component which comprises a negative meniscus lens element disposed on the object side and having a convex surface on the object side and a second positive lens component which comprises at least one positive lens element, wherein said second lens unit is composed in order from the object side of a first lens component which consists of a negative lens element having higher curvature on an image side surface thereof and a negative lens element, and a second lens component which is disposed on the image side and comprises a positive lens element having higher curvature on an object side thereof, wherein said third lens unit consists, in order from the object side, of two positive lens elements and a negative lens element, wherein said fourth lens unit consists, in order from the object side, of a negative lens element and two positive lens elements, and wherein said zoom lens system satisfies the following conditions:

$0.13 < f_W/f_1 < 0.18$ (51)

$-0.83 < f_W/f_2 < -0.53$ (52)

$0.20 < 1/SF_{1N} < 0.30$ (53)

$0.70 < 1/SF_{2N} < 1.30$ (54)

$-0.80 < 1/SF_{2P} < -0.25$ (55)

wherein the reference symbols $f_W$, $f_1$, $f_2$, $SF_{1N}$, $SF_{2N}$, and $SF_{2P}$ represent a focal length of the zoom lens system as a whole at a wide position thereof, a focal length of the first lens unit, a focal length of the second lens unit, a shaping factor for the negative meniscus lens element disposed on the object side in the first lens unit, a shaping factor for the negative lens element disposed on the object side in the second lens unit and a shaping factor for the positive lens element disposed on the image side in the second lens unit, respectively, wherein a shaping factor SF is expressed by the following formula, $$SF = (r_a + r_b)/(r_a - r_b)$$

wherein the reference symbols $r_a$ and $r_b$ represent radii of curvature on an object side surface and an image side surface respectively of a lens element.

42. A zoom lens system comprising, in order from the object side:

a first lens unit having a positive power;

a second lens unit which has a negative power and is moved during zooming monotonously along an optical axis mainly for sharing a vari-focal function;

a third lens unit having a positive power; and a fourth lens unit which has a positive power, and is moved during zooming axially in both directions for correcting a deviation of a location of an image surface caused by changing a magnification, wherein said zoom lens system is focused by moving the third lens unit, the fourth lens unit or at least one of lens components disposed in the third lens unit and the fourth lens unit, wherein said first lens unit is composed, in order from the object side, of a first lens component which comprises a negative meniscus lens element disposed on the object side and having a convex surface on the object side and a second positive lens component which comprises at least one positive lens element, wherein said second lens unit is composed, in order from the object side, of a first lens component which consists of a negative lens element having higher curvature on an image side surface thereof and a negative lens element, and a second lens component which is disposed on the image side and comprises a positive lens element having higher curvature on an object side thereof, wherein said third lens unit consists, in order from the object side, of a positive lens element, a negative lens element and a positive lens element, wherein said fourth lens unit consists, in order from the object side, of two positive lens elements and a negative lens element, and wherein said zoom lens system satisfies the following conditions:

$$0.13 < f_W/f_1 < 0.18 \quad (51)$$
$$-0.83 < f_W/f_2 < -0.53 \quad (52)$$
$$0.20 < 1/SF_{1N} < 0.30 \quad (53)$$
$$0.70 < 1/SF_{2N} < 1.30 \quad (54)$$
$$-0.80 < 1/SF_{2P} < -0.25 \quad (55)$$

wherein the reference symbols $f_W$, $f_1$, $f_2$, $SF_{1N}$, $SF_{2N}$, and $SF_{2P}$ represent a focal length of the zoom lens system as a whole at a wide position thereof, a focal length of the first lens unit, a focal length of the second lens unit, a shaping factor for the negative meniscus lens element disposed on the object side in the first lens unit, a shaping factor for the negative lens element disposed on the object side in the second lens unit and a shaping factor for the positive lens element disposed on the image side in the second lens unit, respectively, wherein a shaping factor SF is expressed by the following formula, $$SF = (r_a + r_b)/(r_a - r_b)$$

wherein the reference symbols $r_a$ and $r_b$ represent radii of curvature on an object side surface and an image side surface of a lens element.

43. A zoom lens system comprising in order from the object side:
   a first lens unit having a positive power
   a second lens unit which has a negative power and is moved during zooming monotonously alone an optical axis mainly for sharing a vari-focal function;
   a third lens unit having a positive power; and
   a fourth lens unit which has a positive power and is moved during zooming axially in both directions for correcting a deviation of a location of an image surface caused by changing a magnification,
   wherein said zoom lens system is focused by moving the third lens unit, the fourth lens unit or at least one of lens components disposed in the third lens unit and the fourth lens unit;
   wherein said first lens unit is composed, in order from the object side, of a first lens component which comprises a negative meniscus lens element disposed on the object side and having a convex surface on the object side and a second positive lens component which comprises at least one positive lens element,
   wherein said second lens unit is composed, in order from the object side, of a first lens component which consists of a negative lens element having higher curvature on an image side surface thereof and a negative lens element and a second lens component which is disposed on the image side and comprises a positive lens element having higher curvature on an object side thereof,
   wherein said third lens unit consists, in order from the object side, of two positive lens elements and a negative lens element,
   wherein said fourth lens unit consists, in order from the object side, of two positive lens elements and a negative lens element, and wherein said zoom lens system satisfies the following conditions:

$$0.13 < f_W/f_1 < 0.18 \quad (51)$$
$$-0.83 < f_W/f_2 < -0.53 \quad (52)$$
$$0.20 < 1/SF_{1N} < 0.30 \quad (53)$$
$$0.70 < 1/SF_{2N} < 1.30 \quad (54)$$
$$-0.80 < 1/SF_{2P} < -0.25 \quad (55)$$

wherein the reference symbols $f_W$, $f_1$, $f_2$, $SF_{1N}$, $SF_{2N}$, and $SF_{2P}$ represent a focal length of the zoom lens system as a whole at a wide position thereof, a focal length of the first lens unit, a focal length of the second lens unit, a shaping factor for the negative meniscus lens element disposed on the object side in the first lens unit, a shaping factor for the negative lens element disposed on the object side in the second lens unit and a shaping factor for the positive lens element disposed on the image side in the second lens unit, respectively, wherein a shaping factor SF is expressed by the following formula $$SF = (r_a + r_b)/(r_a - r_b)$$

wherein the reference symbols $r_a$ and $r_b$ represent radii of curvature on an object side surface and an image side surface of a lens element.

44. A zoom lens system comprising, in order from the object side:
   a first lens unit having a positive power;
   a second lens unit which has a negative power and is moved during zooming monotonously along an optical axis mainly for sharing a vari-focal function;
   a third lens unit having a positive power; and
   a fourth lens unit which has a positive power and is moved during zooming axially in both directions for correcting a deviation of a location of an image surface caused by changing a magnification,
   wherein said zoom lens system is focused by moving the third lens unit, the fourth lens unit or at least one of lens components disposed in the third lens unit and the fourth lens unit,
   wherein said first lens unit is composed, in order from the object side, of a first lens component which comprises a negative meniscus lens element disposed on the object side and having a convex surface on the object side and a second positive lens component which comprises at least one positive lens element,
   wherein said second lens unit is composed, in order from the object side, of a first lens component which consists of a negative lens element having higher curvature on an image side surface thereof and a negative lens element and a second lens component which is disposed on the image side and comprises a positive lens element having higher curvature on an object side thereof,
   wherein said third lens unit consists, in order from the object side, of a positive lens element, a negative lens element and a positive lens element,
   wherein said fourth lens unit consists, in order from the object side, of a positive lens element, a negative lens element and a positive lens element, and,
   wherein said zoom lens system satisfies the following conditions:

$$0.13 < f_W/f_1 < 0.18 \quad (51)$$

$$-0.83 < f_W/f_2 < -0.53 \quad (52)$$

$$0.20 < 1/SF_{1N} < 0.30 \quad (53)$$

$$0.70 < 1/SF_{2N} < 1.30 \quad (54)$$

$$-0.80 < 1/SF_{2P} < -0.25 \quad (55)$$

length of the zoom lens system as a whole at a wide position thereof, a focal length of the first lens unit, a focal length of the second lens unit, a shaping factor for the negative meniscus lens element disposed on the object side in the first lens unit, a shaping factor for the negative lens element disposed on the object side in the second lens unit and a shaping factor for the positive lens element disposed on the image side in the second lens unit, respectively, wherein a shaping factor SF is expressed by the following formula, $$SF = (r_a + r_b)/(r_a - r_b)$$

wherein the reference symbols $r_a$ and $r_b$ represent radii of curvature on an object side surface and an image side surface of a lens element.

* * * * *